US007444204B2

(12) United States Patent
Chirnomas

(10) Patent No.: US 7,444,204 B2

(45) Date of Patent: Oct. 28, 2008

(54) VENDING MACHINE

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 81 days.

(21) Appl. No.: 11/413,263

(22) Filed: Apr. 29, 2006

(65) Prior Publication Data

US 2006/0191950 A1 Aug. 31, 2006

Related U.S. Application Data

(63) Continuation of application No. 10/306,807, filed on Nov. 27, 2002, now Pat. No. 7,044,330.

(51) Int. Cl.
*G06F 17/00* (2006.01)

(52) U.S. Cl. .......................... 700/244; 700/236; 221/2; 221/4

(58) Field of Classification Search ..................... 221/8, 221/12, 13, 21; 700/236, 241, 244
See application file for complete search history.

(56) References Cited

U.S. PATENT DOCUMENTS

| | | | | | |
|---|---|---|---|---|---|
| 4,237,536 | A | * | 12/1980 | Enelow et al. | 700/241 |
| 4,858,743 | A | * | 8/1989 | Paraskevakos et al. | 194/205 |
| 5,091,713 | A | * | 2/1992 | Horne et al. | 700/236 |
| 5,240,139 | A | * | 8/1993 | Chirnomas | 221/2 |
| 5,996,838 | A | * | 12/1999 | Bayer et al. | 221/75 |

* cited by examiner

*Primary Examiner*—Gene O. Crawford
*Assistant Examiner*—Timothy R Waggoner
(74) *Attorney, Agent, or Firm*—Laurence C. Edelman

(57) ABSTRACT

The present invention relates generally to improvements in article handling, such as in vending machines, and more particularly, to improvements in:

- methods and apparatus for handling articles using a vacuum-type product lifting/dispensing mechanism,
- article display panels which enhance sales of primary products, and
- product containment systems which improve product storage capacity, as well as the ease and efficiency of product handling, access and loading into the article handling apparatus.

21 Claims, 28 Drawing Sheets

VENDING MACHINE

CROSS-REFERENCE TO RELATED APPLICATIONS

This application is a continuation of and claims priority under 35 USC 120 of prior U.S. Ser. No. 10/306,807, filed Nov. 27, 2002, now U.S. Pat. No. 7,044,330 entitled VENDING MACHINE, which prior application claims priority under 35 USC 120 of U.S. Ser. No. 09/633,477, filed Aug. 7, 2000, entitled VENDING MACHINE, which itself claims priority under 35 USC 120 of U.S. Provisional Patent Application No. 60/147,832, filed Aug. 7, 1999, entitled VENDING MACHINE. The entire disclosure of each of the above patent applications are incorporated herein by reference in their entirety.

BACKGROUND OF THE INVENTION

1. Field of the Invention

The present invention relates generally to improvements in vending machines. More particularly, the present inventions relate to improvements in apparatus for dispensing of product using a vacuum-type product lifting/dispensing mechanism, in product display panels which enhance sales of primary products, and in product containment systems which improve product storage capacity, as well as the ease and efficiency of product handling, access and loading into the machine.

2. Description of the Prior Art

Until recent years, most of the mechanisms used in various product dispensing machines (generally referred to herein as vending machines), relied on a multitude of motors, switches and solenoids for moving various machine parts and otherwise handling of the products (articles) to be dispensed. Most such machines required one motor, switch and/or solenoid for each row, column or type of product or package dedicated to be dispensed therefrom. Such machines generally suffer from numerous disadvantages, such as poor reliability due to mechanical failures, as well known to those skilled in this art. It is desirable to provide for an improved dispensing mechanism having greater reliability and versatility.

Furthermore, a variety of vending machines today typically include a plurality of side-by-side, vertically oriented storage columns or bins which communicate at their top or bottom end with a discharge port in the front of the vending machine for dispensing vendible products stored therein. The columns are disposed in a parallel relationship with respect to each other, and the quantity of stored product therein, such as soda cans or ice cream bars, is usually controlled by proper dimensioning of the area and volume of the columns with respect to the area and volume of storage area inside the vending machine cabinet. This conventional arrangement suffers from several disadvantages: each piece of each product must be separately handled to load the machine, once the machine is in the field there is little flexibility to change the number or types of columns, it is difficult to efficiently match product demand with storage capacity, and it is difficult to increase the storage capacity of the machine.

Even furthermore, it is conventional that vending machines include product display panels which perform certain, highly effective, point-of-purchase functions, such as the identity and source of origin (manufacturer) of the products being vended. However, once the vending machine is out in the field, it is relatively easy for the machine machine/operator to change the display panels and emphasize different products than those for which the machine was originally set up to vend. This can be an undesirable situation, since sometimes a product supplier or manufacturer provides financial assistance to a machine operator of a vending machine with the expectation that product purchases for that machine will compensate the product supplier for the financial assistance. Thus, there is a need in the art for product display panel methods and apparatus which take some product advertising control out of the hands of the machine owner/operator.

The present inventors U.S. Pat. No. 5,240,139 represents a vast improvement in the art in that it provides a negative air pressure (i.e., vacuum) lifter (i.e., product pick-up mechanism), in combination with innovative use of product storage bins, for dispensing products from a refrigerated storage area of the vending machine to a discharge point where it is dispensed to the customer.

Objects of the present inventions are to provide a product vending machine of the type generally shown in U.S. Pat. No. 5,240,139, but which has improved apparatus for product dispensing which are more versatile and reliable, has improved product display panels which enhance sales of primary products, as well as improved product containment systems which increase product storage capacity and improves the ease and efficiency of product handling, access and loading into the machine, all being provided in a cost effective and reliable manner.

SUMMARY OF THE INVENTIONS

In accordance with one aspect of the invention, product display panels are provided in conjunction with a vending machine which enhance the sales of primary products as compared with secondary products also vendible therefrom.

In accordance with further aspects of the invention, a rotational coupling is added to a vacuum hose in the product lifting mechanism of the vending machine, to improve the fit of vacuum hose to the product during lifting and dispensing operations, thereby enhancing its ability to transport unbalanced products, as well as decrease the forces, caused by rotation of the vacuum hose, between the product and the product containment wall, thereby reducing the chance of dropping the product. Further improvements relating to the product lifting mechanism are also shown in the Figures which follow, such as an additional rotational coupling in a cable of the lifting mechanism to compensate for rotation of the vacuum hose during its extension or contraction. An alternate embodiment can utilize the addition of a stabilizer ring or suction cup at the lifting product lifter head for improving the stability and grasp of larger product, especially of the air-filled type (such as potato chip bags).

In accordance with other aspects of the invention, improvements are provided to the product storage container system, as well as a coordination of these improvements with the structure of the vending machine cabinet, so as to increase product storage capacity, as well as improve the ease and efficiency of product handling, access and loading of product into the machine, in a cost effective and reliable manner while still retaining the structural rigidity and integrity of the cabinet.

In accordance with still further aspects of the invention, improvements are provided to the machines' control system so that vacuum is supplied to the lifting mechanism before it contacts the product, and preferably sometime after the mechanism has become aligned with product to be dispensed.

For a fuller understanding of the present invention, reference should now be made to the following detailed description of the preferred embodiments of the invention and to the accompanying Figures.

DETAILED DESCRIPTION OF THE INVENTION

Figure 1:
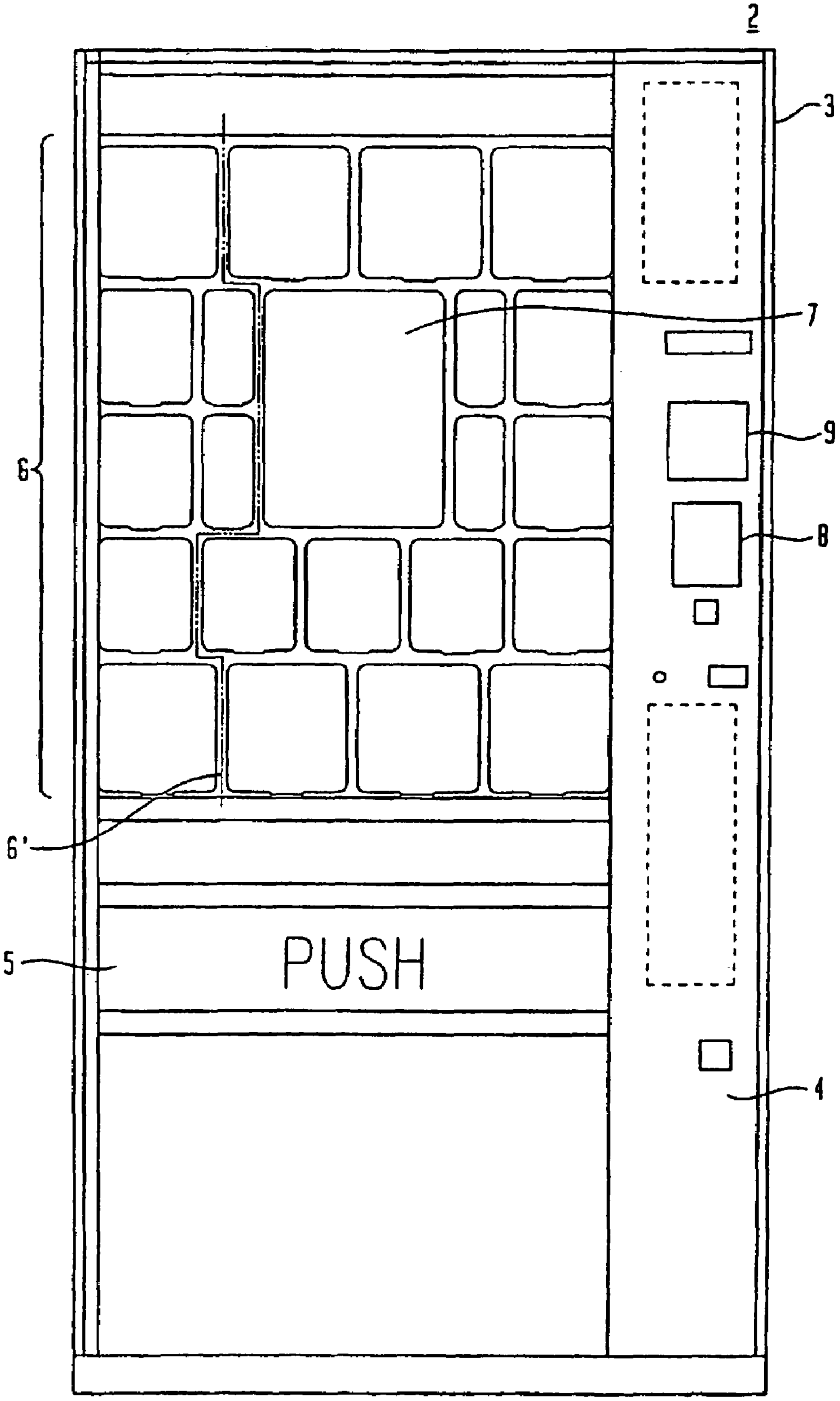
FIG. 1 is a front view of a vending machine constructed and operating in accordance with the principles of the invention.

FIG. 1 shows a vending machine 2 having a generally rectangular 3-dimensional outer housing (cabinet) 3 including a front loading door 4. (Note, in an alternative embodiment a loading door or port could be positioned anywhere on the cabinet.) A customer retrieval door 5 is disposed in a lower part of door 4 while the upper part of door 4 is dominated by a lighted product display area 6. Product display area 6, as described in detail later on, includes a plurality of graphic display panels which illustrate the individual products that are vendible by machine 2, as well as the price and/or selection information for the respective product. A line 6' illustrates a division in display area 6, where all of the individual product graphics which are, for example to the left side of line 6', are on individual panels or display cards, while all of the individual product graphics which are to the right side of line 6' are comprised of multiple graphics for multiple product Selections which are printed or formed as a single graphic on a single multi-graphic panel or card. This technique makes it more difficult for a machine operator to change just a selection in the multi-graphic panel without changing the entire panel, thereby creating an advantage for product suppliers to gain a measure of brand security if they subsidize the cost of machine 2. Note, line 6' is not visible to the user.

Located within display area 6 is a transparent (window) area 7 which allows one to see into the machine and thereby view the dispensing of the product. Accordingly, window area 7 imparts a public performance, i.e., a "theatrical" aspect to the machine, as well as the ability to coordinate the product graphics located on the outside of machine 2 with graphics located inside of machine 2, such as graphics located on the product dispensing mechanism, the backwall of machine 2 and/or on the product storage bins, and/or on internal sidewalls of the cabinet. Located proximate one side of product display area 6 is a currency receiver 8 and keypad 9 which is accessed by the user for paying for and identifying, respectively, a product the user wishes the machine to vend. Additional lighted and unlighted display areas are located above and below area 6, for general product and brand advertising. Display panels 6 and 6' are attached to the inside of front door 4 using conventional techniques, such as opposed rails or slots and/or a support frame. In a further aspect of the inventions disclosed herein, the supports used for the individual product panels 6' are of a type which are relatively easy for the machine/operator to change, while the single large multi-graphic product panel 6 is supported by a frame or mounting inside door 4 which makes is it relatively difficult for the machine/operator to change, while still giving a uniform appearance to a view of individual graphic cards. In an alternate embodiment door 4 would have no window area and instead, for security purposes would have a solid metal door. The graphic systems could be applied to a solid door as well.

Figure 2:
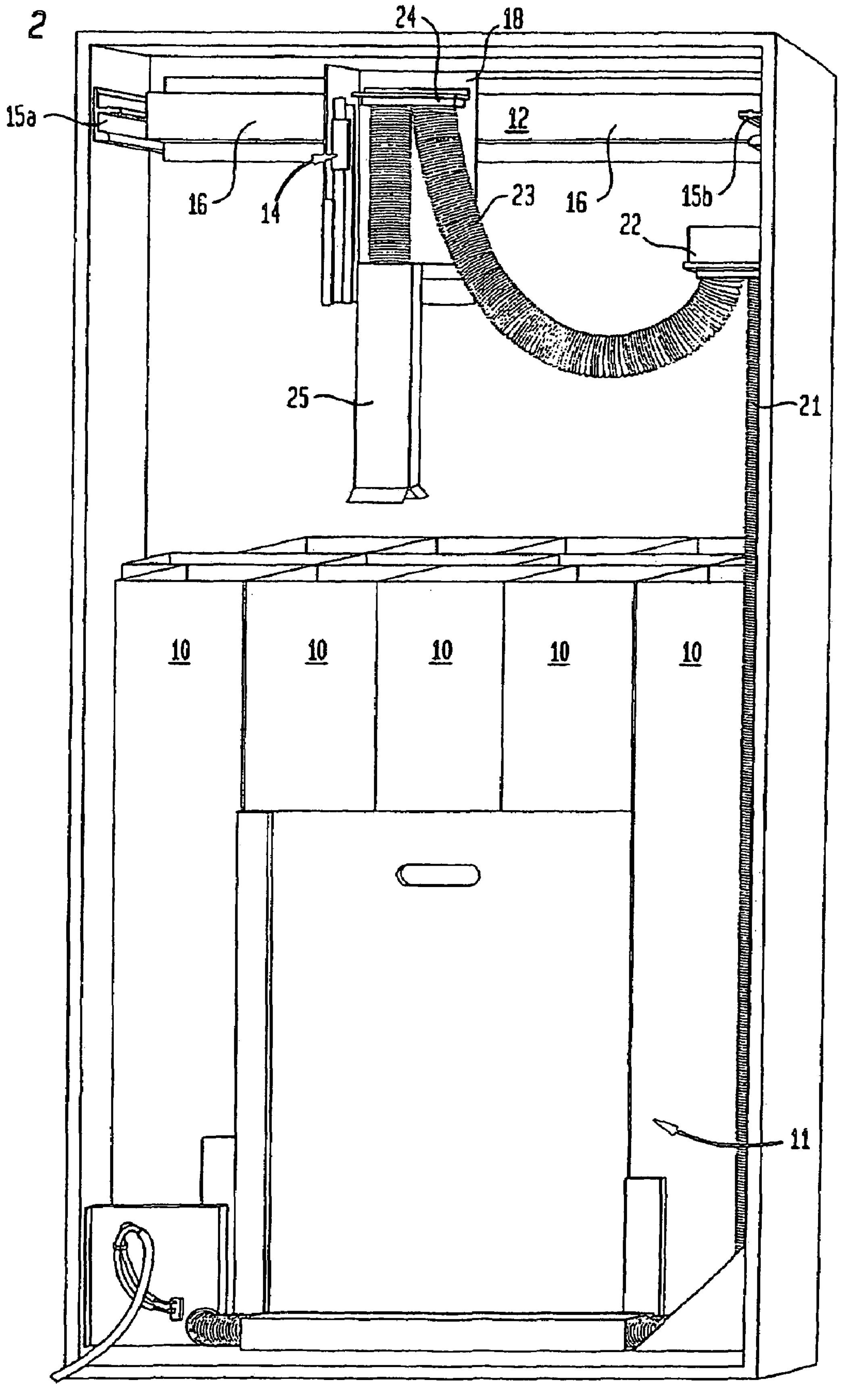
FIG. 2 illustrates the inside of the vending machine shown in FIG. 1 with the door open.
Figure 3:
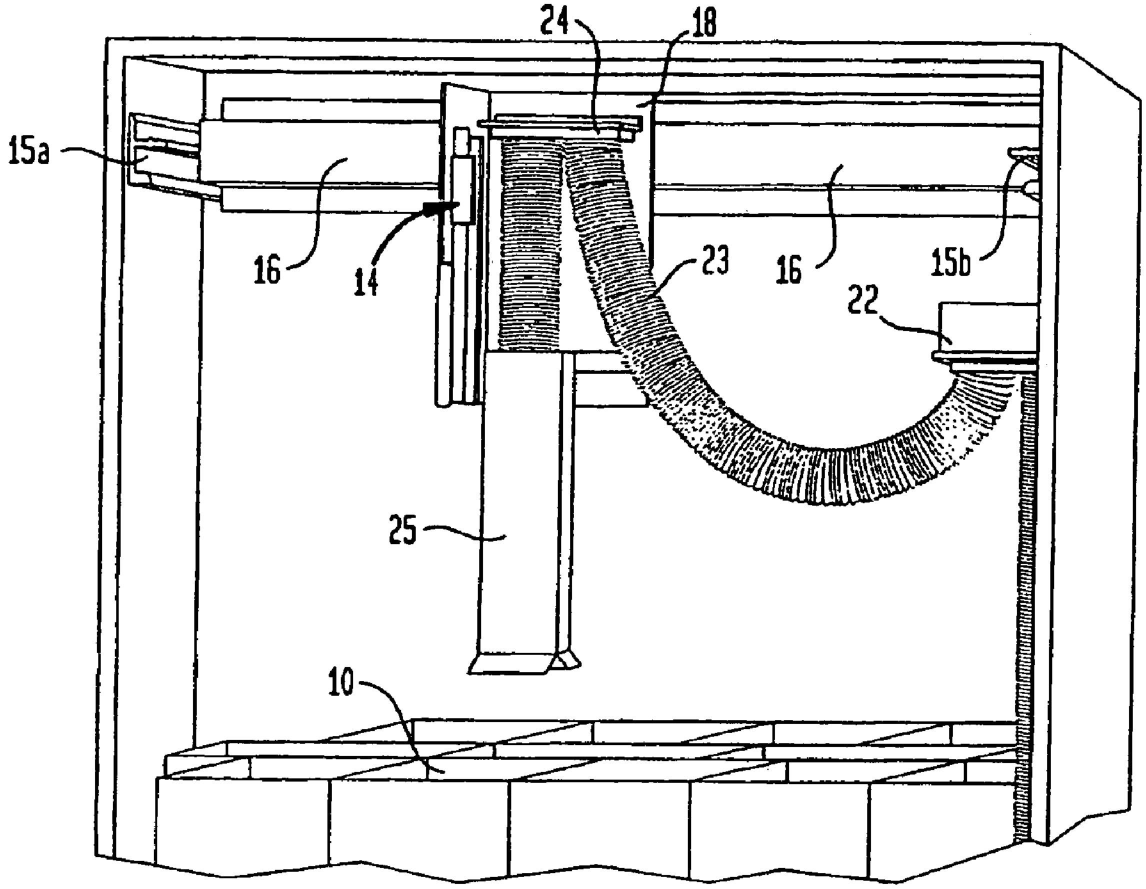
FIGS. 3, 4, 5 and 12 illustrate details of the product lifting mechanism portion of the vending machine shown in FIG. 1.

FIG. 2 illustrates vending machine 2 with its front loading door 4 open, so as to show a plurality of vertically aligned product storage bins 10 arranged in a product storage area 11 of machine 2, and an x-y positioning mechanism 12 for controllably positioning a product lifting mechanism 14 to a desired position over products which are aligned within bins 10.

Figure 19:
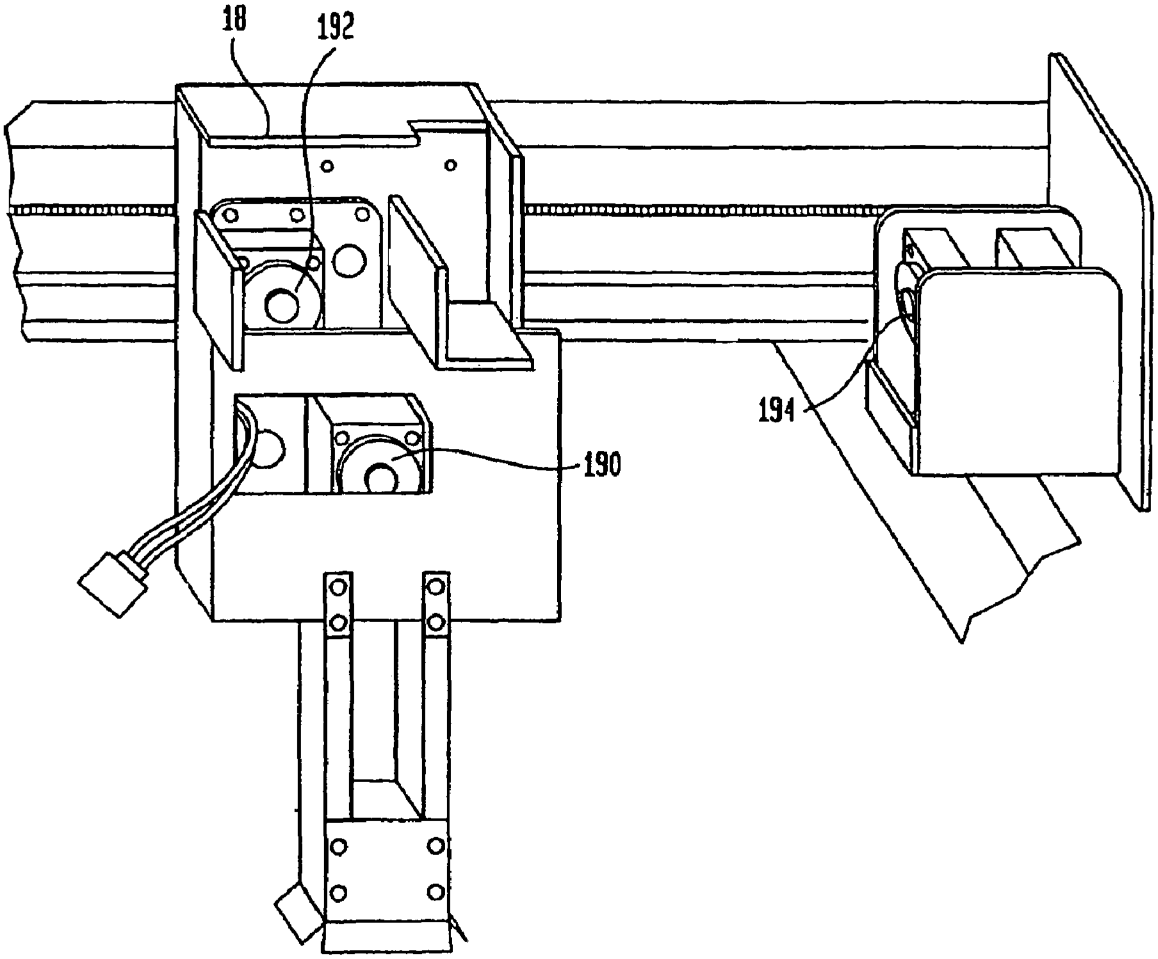
FIG. 19 illustrates the positioning motors for the x-y positioning portion of the vending machine shown in FIG. 1.

FIGS. 3-5 and 19 illustrate details of x-y positioning mechanism 12, which includes left and right Y-direction rails 15*a* and 15*b*, which are fixed to opposite inside surfaces of machine 2 and extend along its depth direction, and an X-direction beam 16, which is positioned along the width of machine 2 and supported at its ends with roller bearings which travel along Y rails. X and Y motors 192 and 194 are shown in FIG. 19. Product lifting mechanism 14 includes a support 18 which is connected with roller bearings to X beam 16 so as to be able to travel in the X direction (left/right) along X beam 16. X-Y positioning mechanism 12 is of conventional design and includes electric motors, gears, cables and sensors which operate in conjunction with a control system (not specifically shown), as well known to those skilled in this art, to provide controlled movement in the X-Y direction for product lifting mechanism 14. The controlled movement locates the product lifting mechanism 14 so that it is vertically aligned with a particular one of a plurality of product storage bins which are located in product storage area 11.

The preceding arrangement for positioning product lifting mechanism 14 over a selected dispensable product in storage area 10 may be referred to collectively as the x-y positioner or more specifically as the product lifter, product lifting mechanism or robot.

Figure 6:
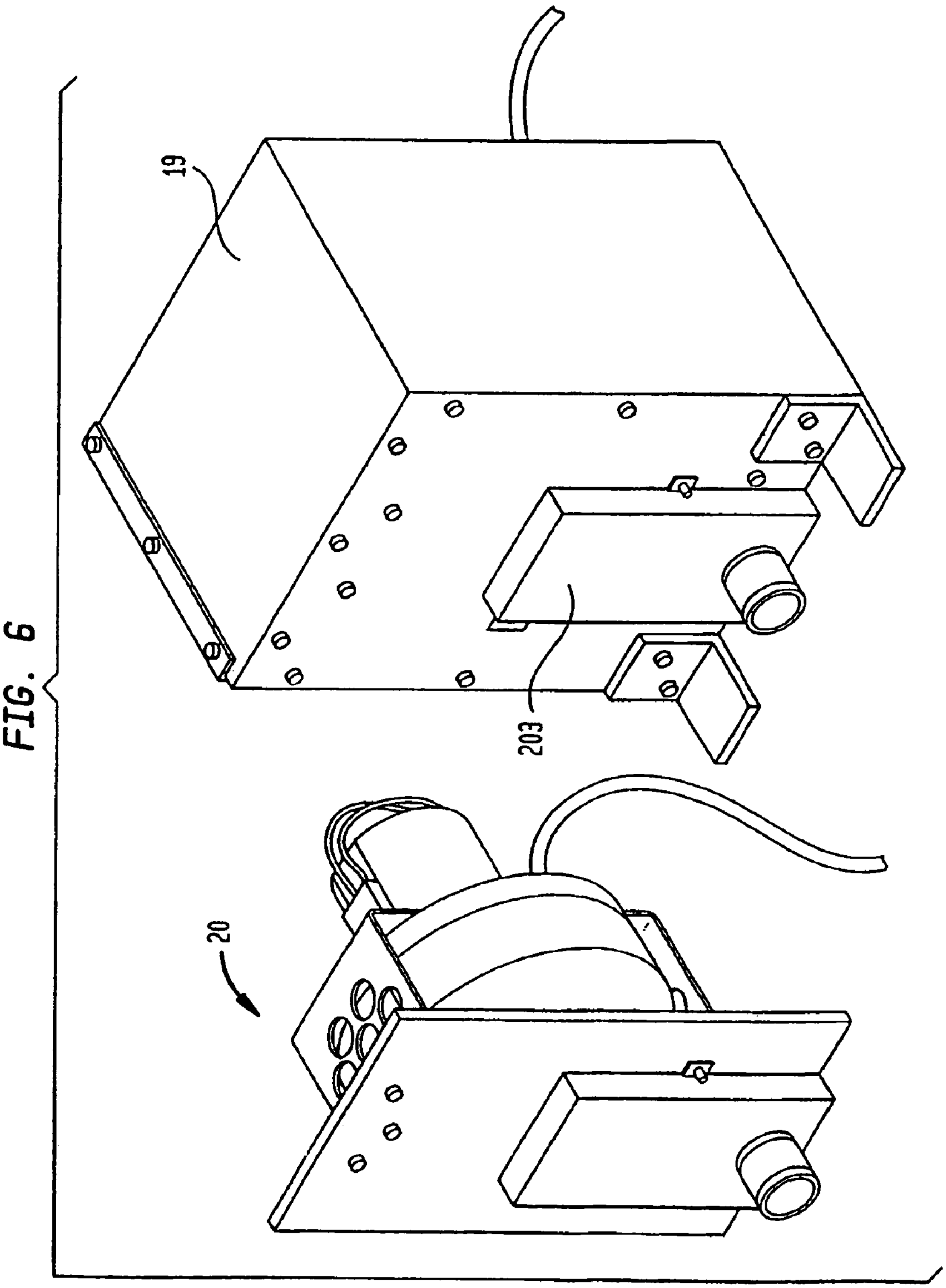
FIG. 6 illustrates details of a blower motor portion of the vending machine shown in FIG. 1.
Figure 7:
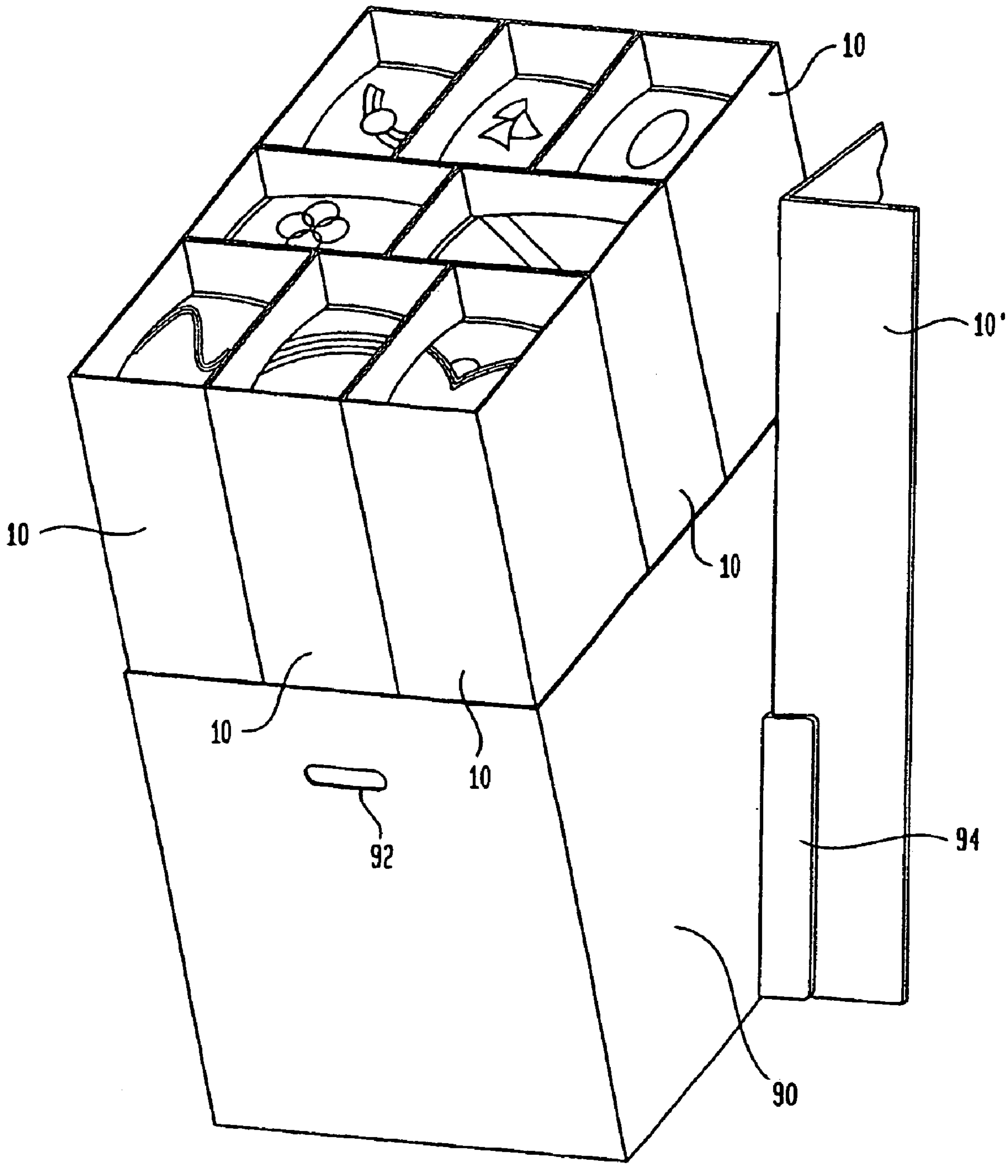
FIG. 7 illustrates details of a macro-box and bins being loaded in between other bins in the vending machine shown in FIG. 1.
Figure 8:
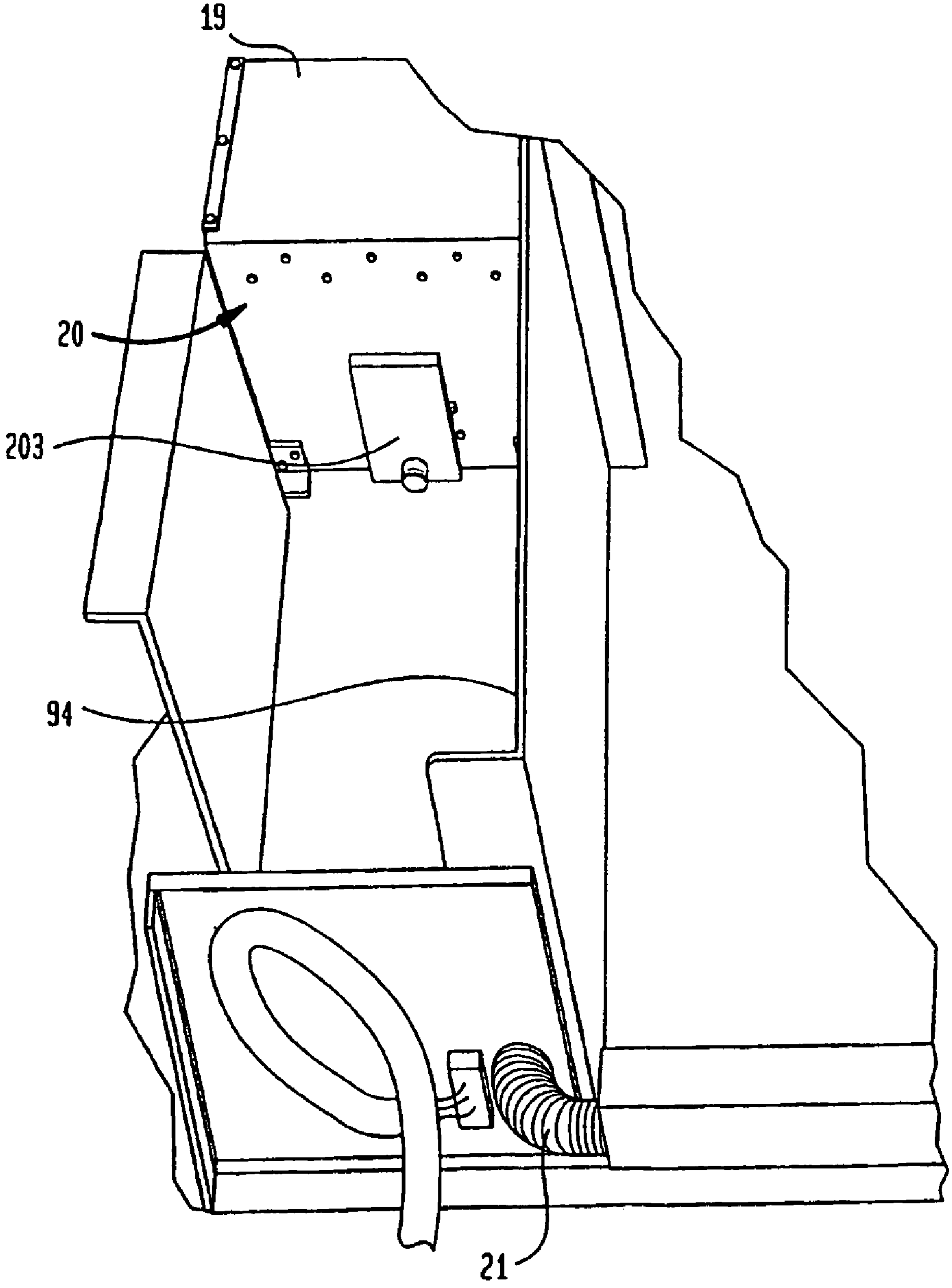
FIG. 8 illustrates a view of the floor of the cabinet including the blower motor bulkhead gusset and bin/macro-box retaining walls.
Figure 23:
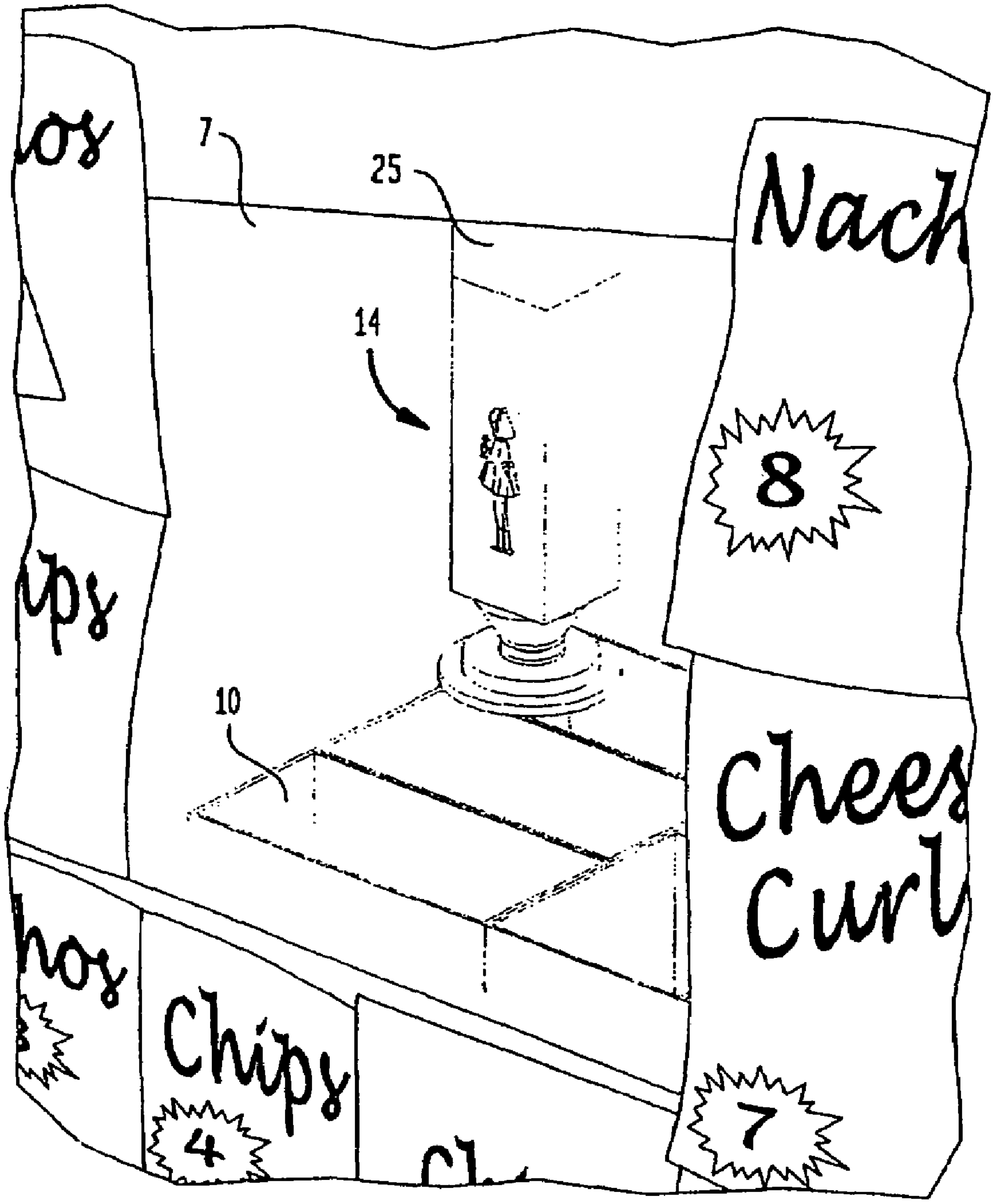
Figure 24:
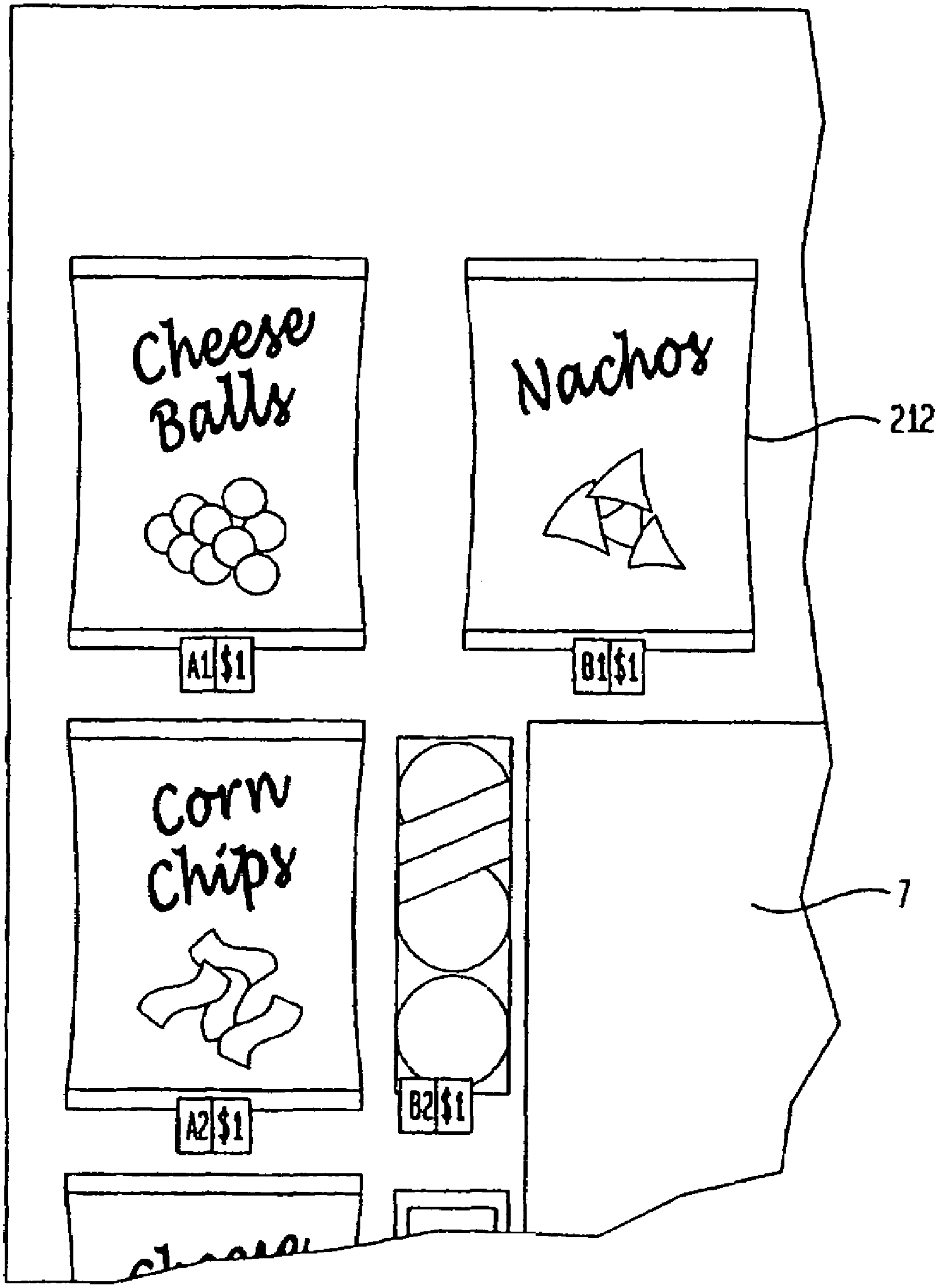
Figure 28:
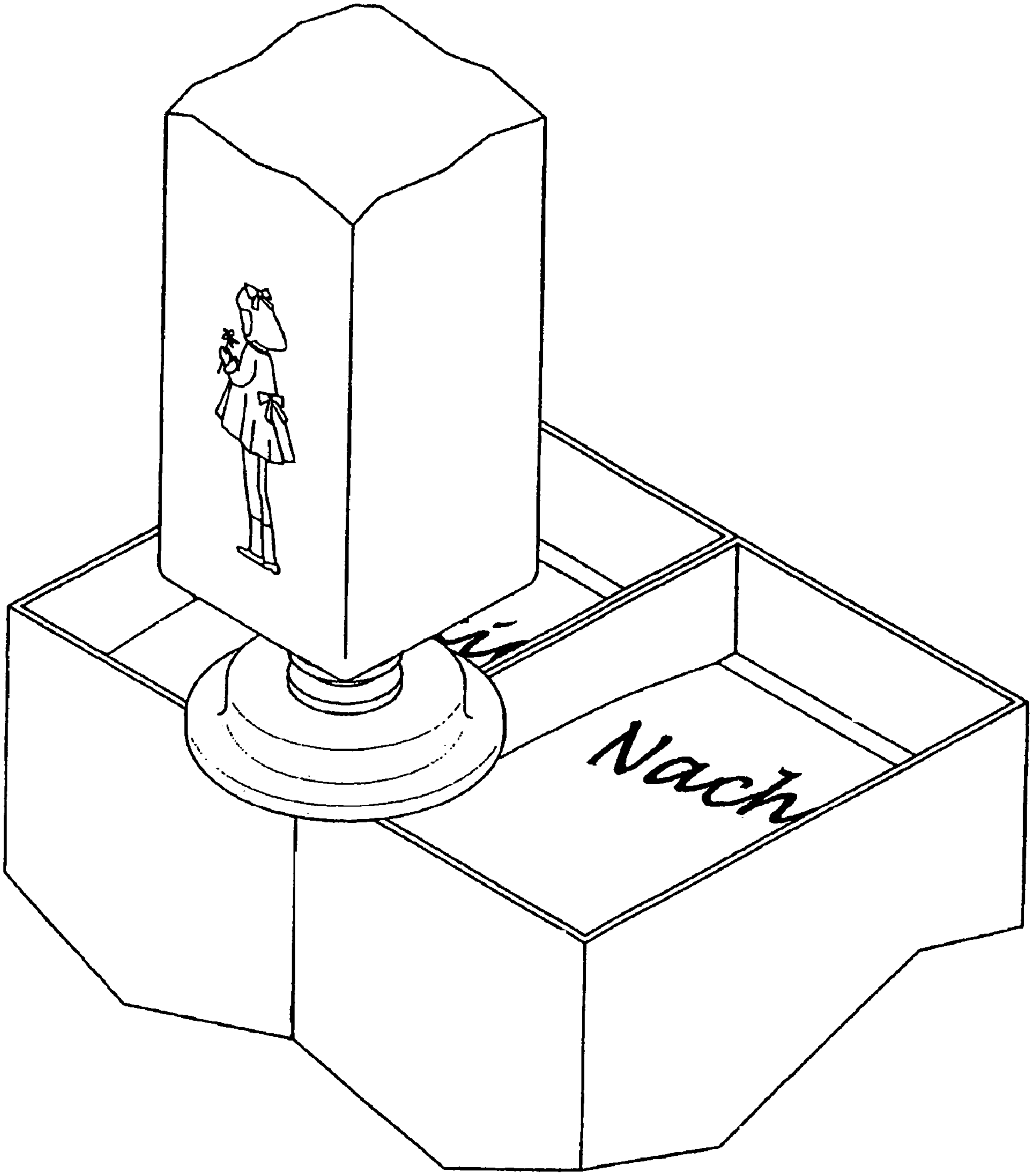
FIG. 28 illustrates a graphic and product stabilizer on the robot head.

A source of negative air pressure, i.e., vacuum, is provided by a blower motor (or vacuum pump) 20 located near the back of the machine cabinet 3, as shown in FIG. 8. Blower motor 20 has connected thereto, via an offset conduit 203 (as shown in FIG. 6), a semi-flexible air hose 21 (shown in FIG. 8 near the bottom front of the machine) which supplies vacuum pressure to a vacuum junction box 22 (which is optional). Junction box 22 provides a convenient point for connection of hose 21 to a more flexible hose 23 to provide the vacuum pressure to lifting mechanism 14. A vacuum conduit 24 attached to support 18 receives vacuum from hose 23 and transfers it to a longitudinally-compressible, self-retracting wire spring hose 26. Lifting mechanism 14 includes a guide tube 25 extending down therefrom which constrains hose 26 therein. Hose 26 has a 3:1 compression factor and is used to conduct the vacuum from vacuum conduit 24 to an upper end of a product lifter product lifter head 28. Product lifter head 28 acts as a counterweight to prevent sudden movements of hose 26 due to a sudden increase in vacuum pressure which occurs when its end is sealed as it comes into contact with the packaging of a product. Guide tube 25 has mounted on an outer surface thereof a z-origin sensor to assist in control of lifting mechanism 14, and may optionally also have mounted thereon a graphic or 3D character (as shown in FIGS. 23 and 28), for information or entertainment value. It is noted that blower motor 20 is advantageously of the type which provides a relatively high volume of air flow, but relatively low vacuum pressure. This combination is particularly good for picking up, packages since a momentary, or even a sustained leak in the coupling to the product's packaging will generally not result in a dropped package.

Figure 5:
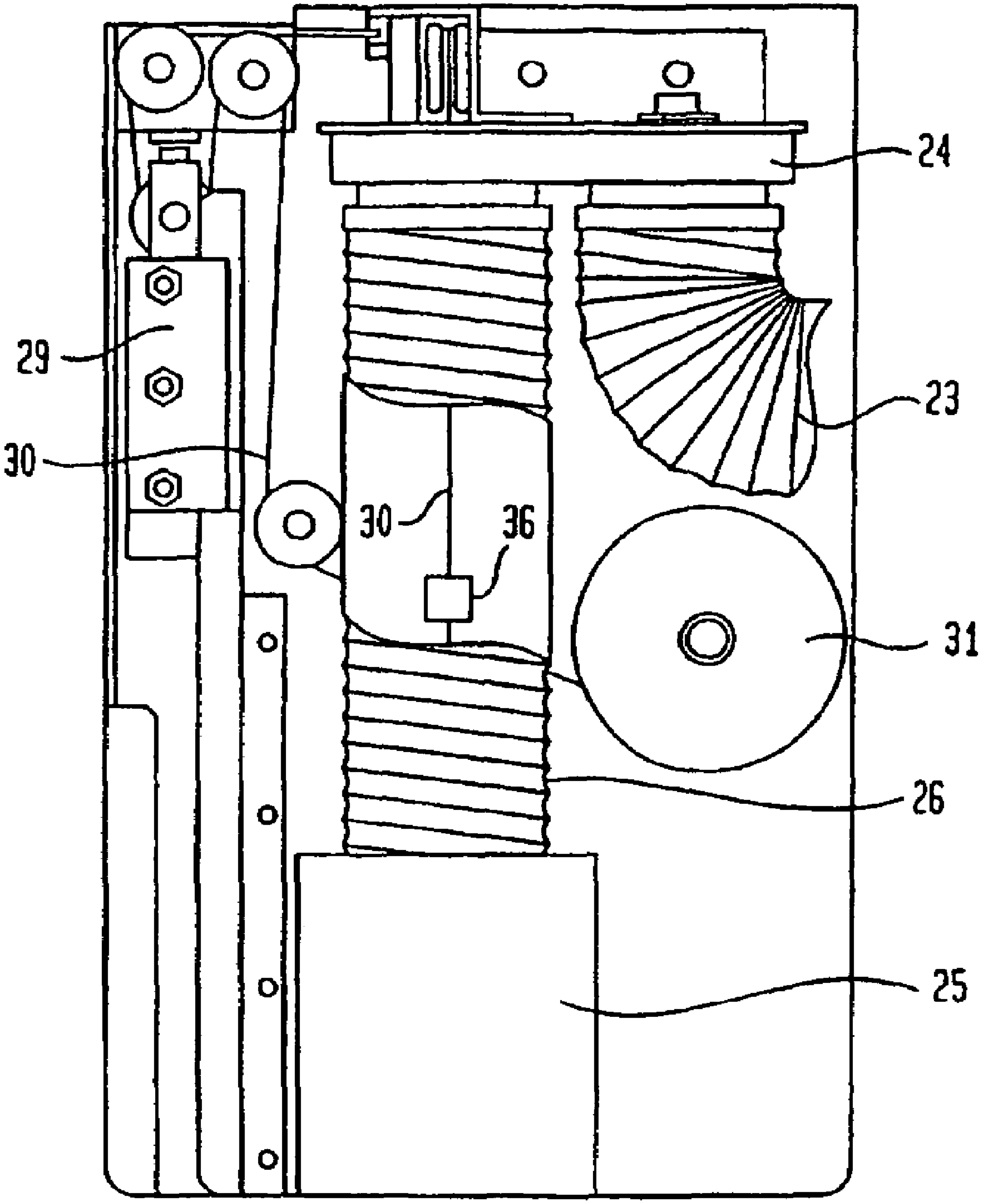

A Z motor 190, shown in FIG. 19, is mounted to support 18 and is responsive to the control system for raising and lowering product lifter head 28 via a cable 30 attached between a reel 31 shown in FIG. 5 and the top of product lifter head 28. Cable 30 is arranged to pass coaxially inside hose 26. Product lifter head 28 has a central bore therethrough for conducting the vacuum provided by hose 26 to a flexible circular rubber gasket (or suction cup) 32, which provides for greater conformance to the contours of a package, and hence more lifting vacuum during the operation of product lifting mechanism 14.

The above arrangement is constructed and operates in accordance with well known techniques, and except where the above and following description is inconsistent with the construction and operation of the vending machine described in the present inventors prior U.S. Pat. No. 5,240,139, it is substantially the same. Note, however that the freezer compartment shown in U.S. Pat. No. 5,240,139 is not included herein.

In operation, a machine operator fills machine 2 with vendible products using the storage bins 10. As described in detail later on, the present invention provides several improvements relating to the bins 10. A user observes the product ID and cost information of a desired product from the product graphic depicted in display panel 6 or 6', and inserts the proper amount of currency into currency receiver 8 and inputs the appropriate product code onto keypad 9. In response, the control system of machine 2, such as an appropriately programmed microprocessor, and its associated parts, causes lifting mechanism 14 to become vertically aligned with the storage bin 10 holding the selected product. Then in a preferred embodiment, microprocessor energizes blower motor 20 when product lifter head 28 is in the immediate proximity of selected product, due to the microprocessor maintaining update information about the product height in each product bin. This is particularly advantageous in the event that the inside of the cabinet or a portion thereof, is refrigerated, since it would decrease the amount of cold air being displaced by the blower. In an alternate embodiment vacuum is turned on just before head 28 is lowered into the bin holding the desired product. As soon as product lifter product lifter head 28, via gasket 32, touches the product, a vacuum sensor senses the change in vacuum. In response to the sensed change in vacuum, control system causes take-up reel 31 to rotate, thereby lifting the desired product out of bin 10 and toward a product discharge chute or area. When the product is properly positioned for dispensing (as determined by position sensors in the x-y positioner), blower motor 20 is stopped, the loss of vacuum causes product lifter head 28 to release the product, and the product drops towards customer door 5 for subsequent retrieval by the user.

One problem encountered by the above apparatus is that self-retracting hose 26 rotates as it is extended or compressed, due to its internal spiral spring. As a result, product lifter head 28 rotates as hose 26 is lowered into a bin 10. However, as the product is lifted out of bin 10, product lifter head 28 and hose 26 are restrained from rotating back to their original orientation, due to the tight fit of the product within bin 10. Such restraint could cause gasket 32 to break its contact with the product during the lifting operation, especially for "air-filled" bagged products.

Figure 4:
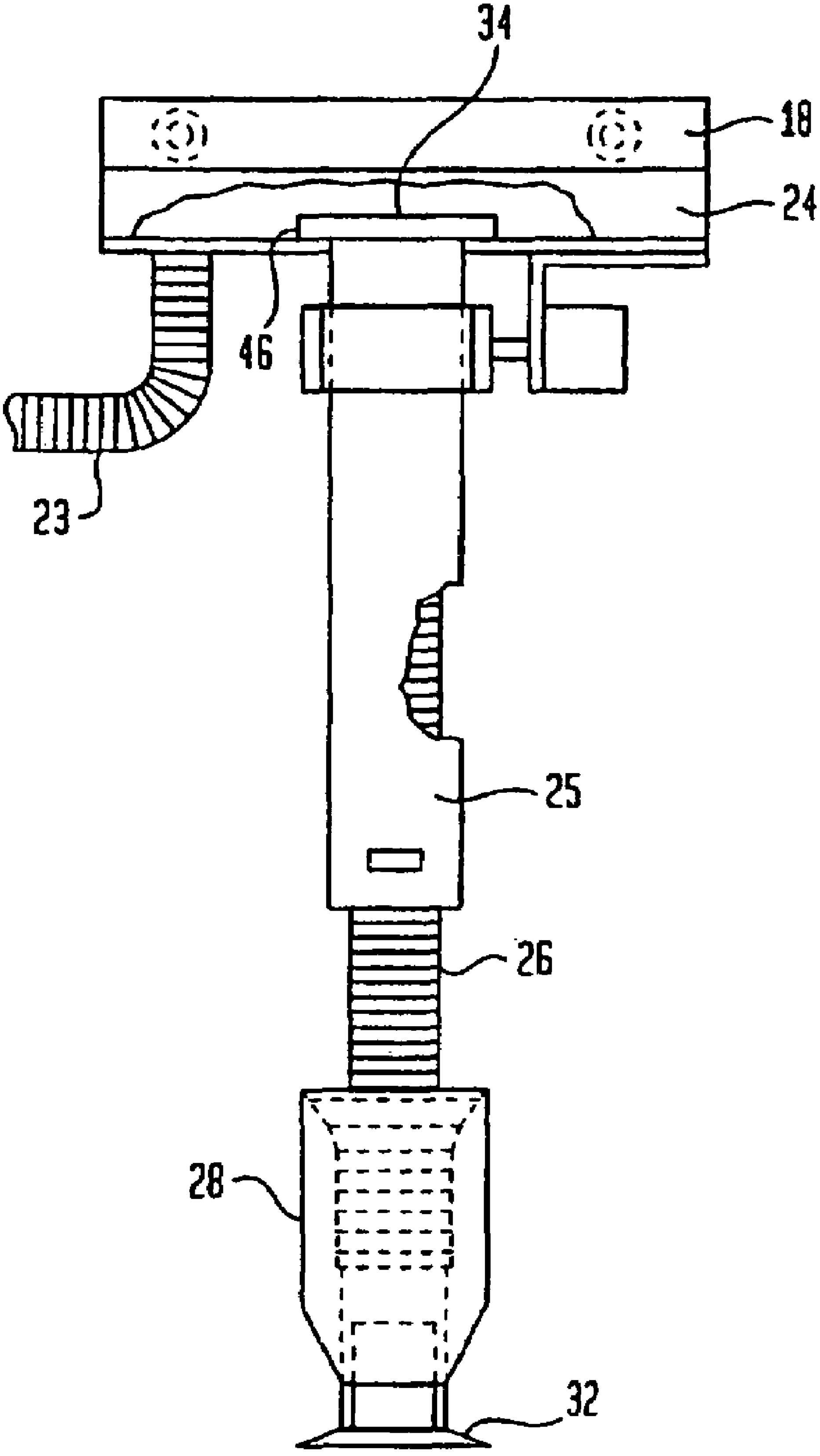

In accordance with an aspect of the present invention, as shown in FIGS. 4 and 5, a rotational coupling 34 is connected to air hose 26 which allows the end of hose 26 which is remote from the picked-up product to rotate, and thereby compensate for the non-rotation of product lifter product lifter head 28 during its retraction from a bin 10. In the preferred embodiment, rotational coupling 34 comprises a flanged tube having its flanged end located in vacuum conduit 24, to minimize any adverse effect on the maximum retraction of product lifter head 28, and its other end protruding outside conduit 24 and connected by a press fit onto hose 26 and secured thereto with a spring clip, band, or other suitable means. In accordance with this preferred embodiment, a rotational coupling 36 is also provided in cable 30, since although it rotates as product lifter head 28 is lowered into the bin, it is prevented from rotation upon retraction. Accordingly, coupling 36 prevents cable 30 from becoming incrementally twisted or untwisted during each vend cycle, thereby weakening the cable.

In accordance with in an alternative embodiment, rotational coupling 34 could be located between product lifter head 28 and product contact gasket 32, thereby avoiding the requirement of a rotation coupling for cable 30. Alternately, rotational coupling 34 can be put where hose 26 meets head 28.

Figure 20:
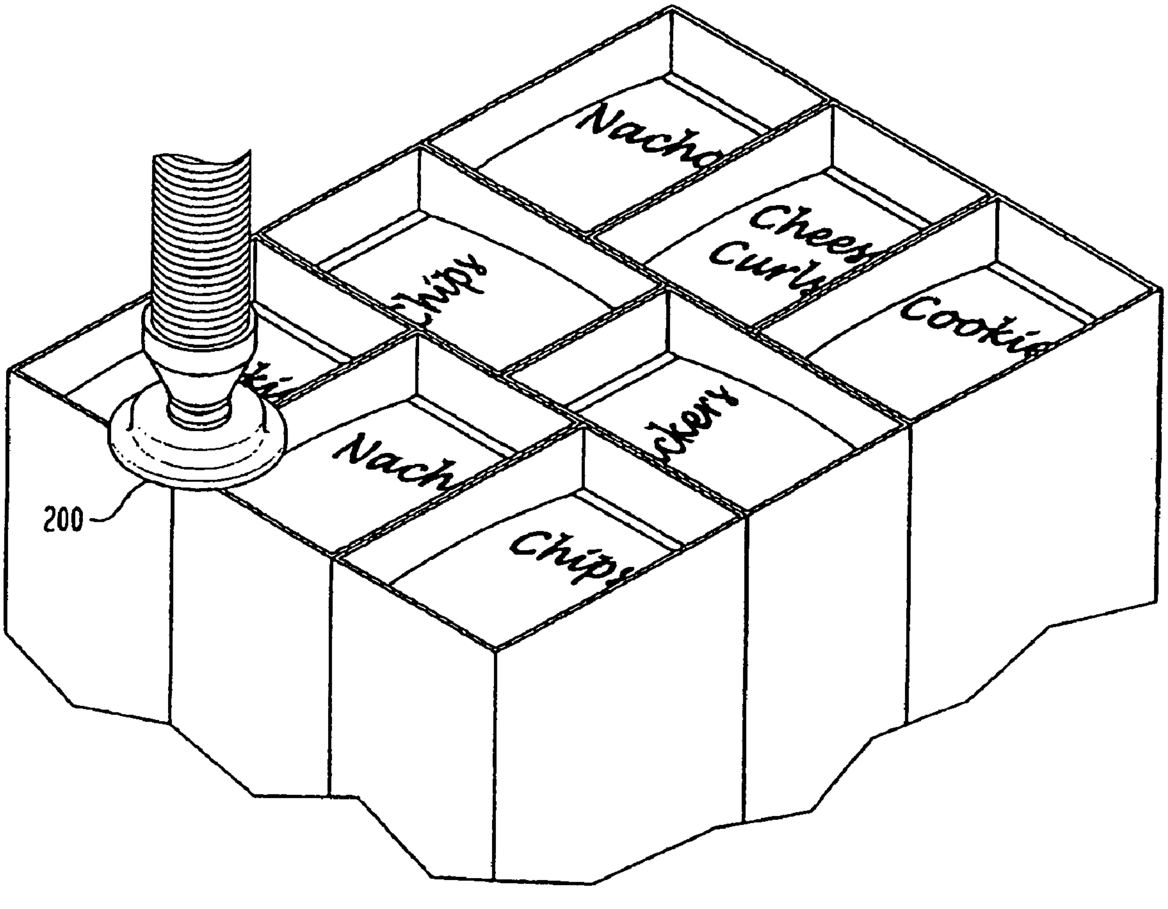
FIG. 20 illustrates details of the product stabilizer mounted to the product lifter head.
Figure 21:
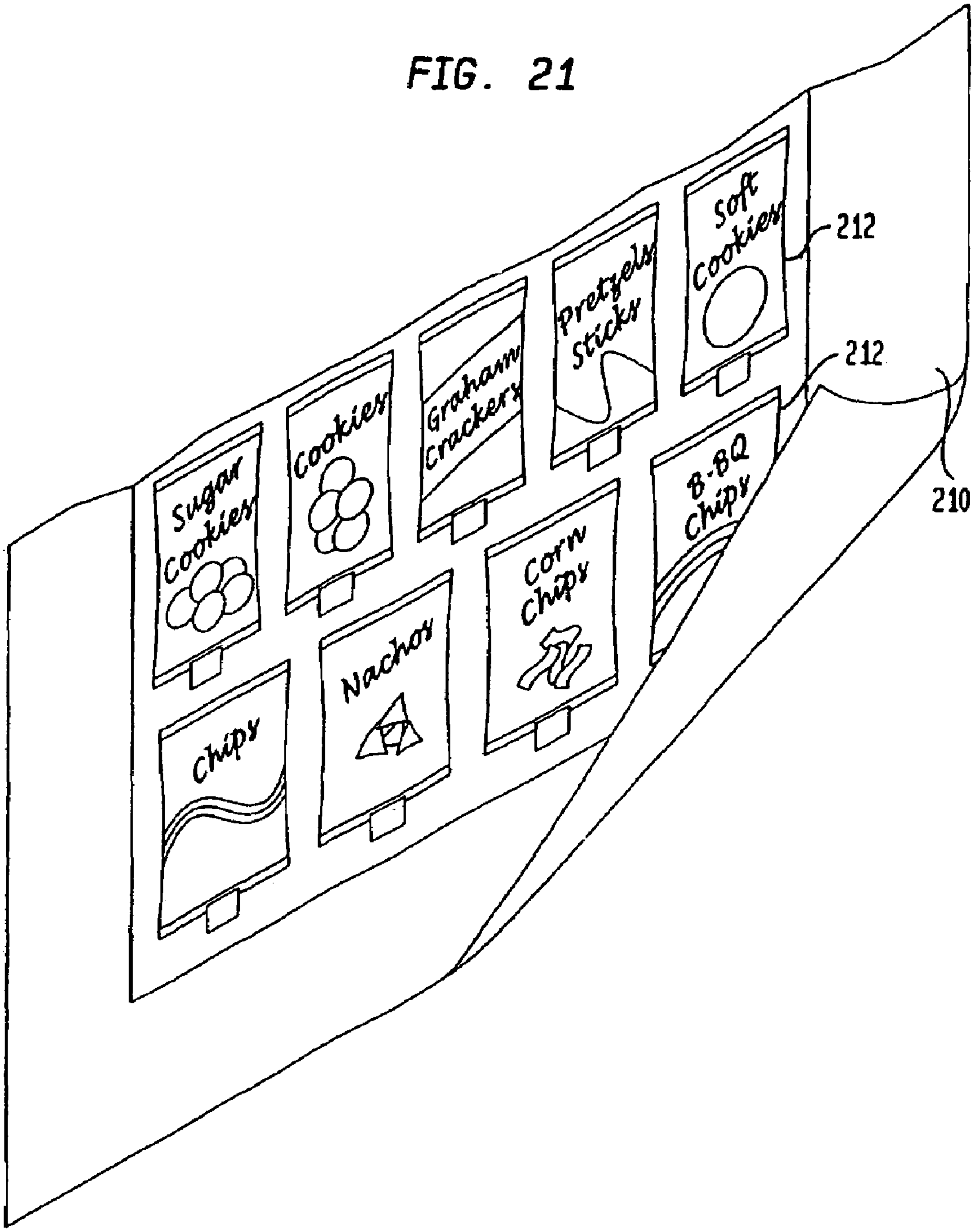
FIGS. 21 to 24 illustrate the primary type of graphic card, comprising a single sheet 210 having multi-graphic product displays 212 thereon.
Figure 22:
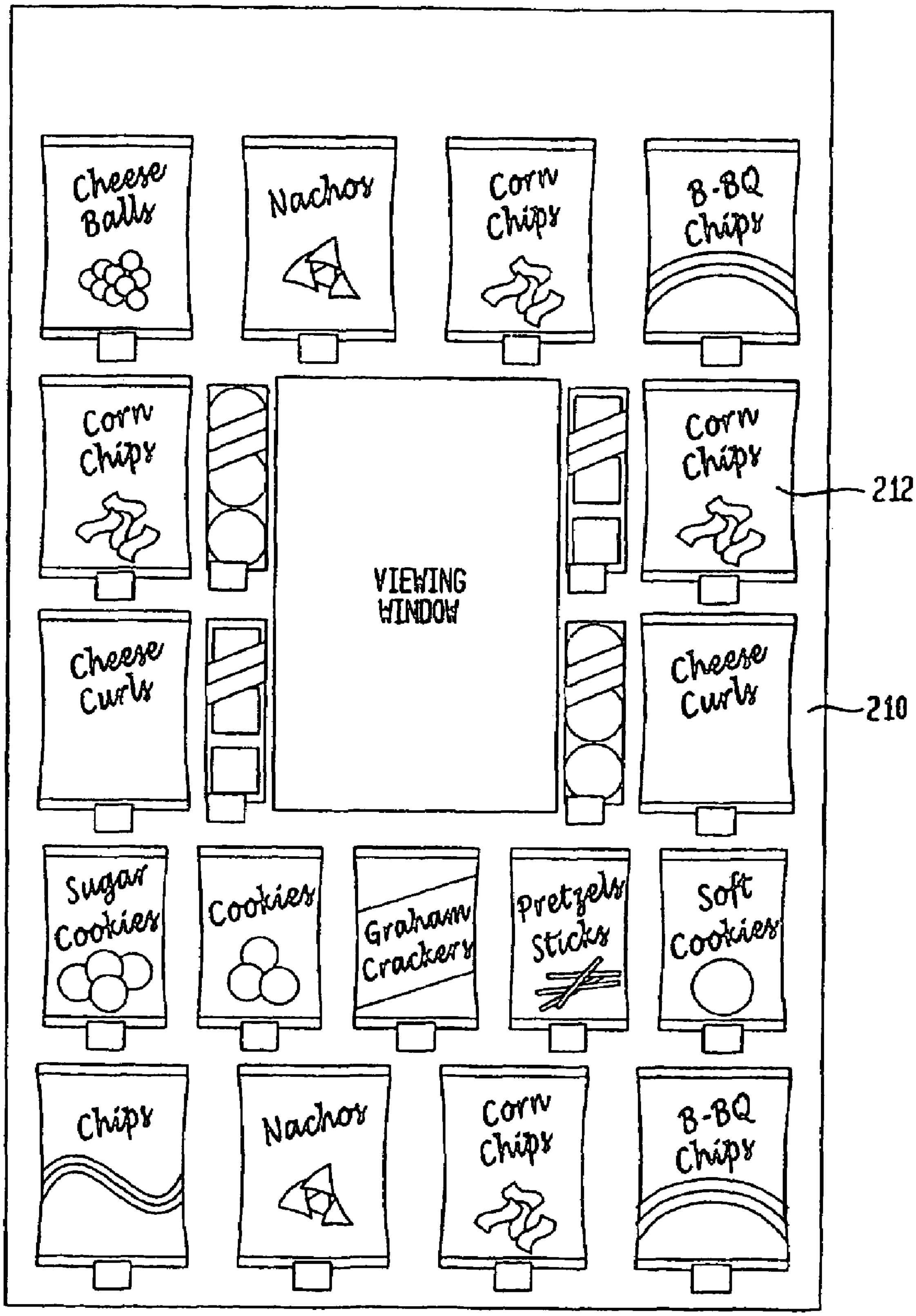

In accordance with an even further aspect of the invention, as shown in FIG. 20, a product stabilizing ring 200 is added to the product lifter head of the vacuum lifter, so as to stabilize a product from movement after being contacted by product lifter head 28, and thereby help ensure a more consistent contact to a major surface of the product packaging, and hence a more air-tight coupling to the product.

In accordance with a still further aspect of the invention, vacuum is provided to the product lifting mechanism before it enters a product storage bin, and in accordance with a preferred embodiment of this aspect of the invention, vacuum is provided to the product lifting mechanism before lifter head 28 contacts product in the storage bin. This ensures adhesion of the product to head 28 immediately upon its contact with the product, such that there is no opportunity for the product to shift away from suction cup 32, which would otherwise be possible due to the weight of head 28.

Figure 12:
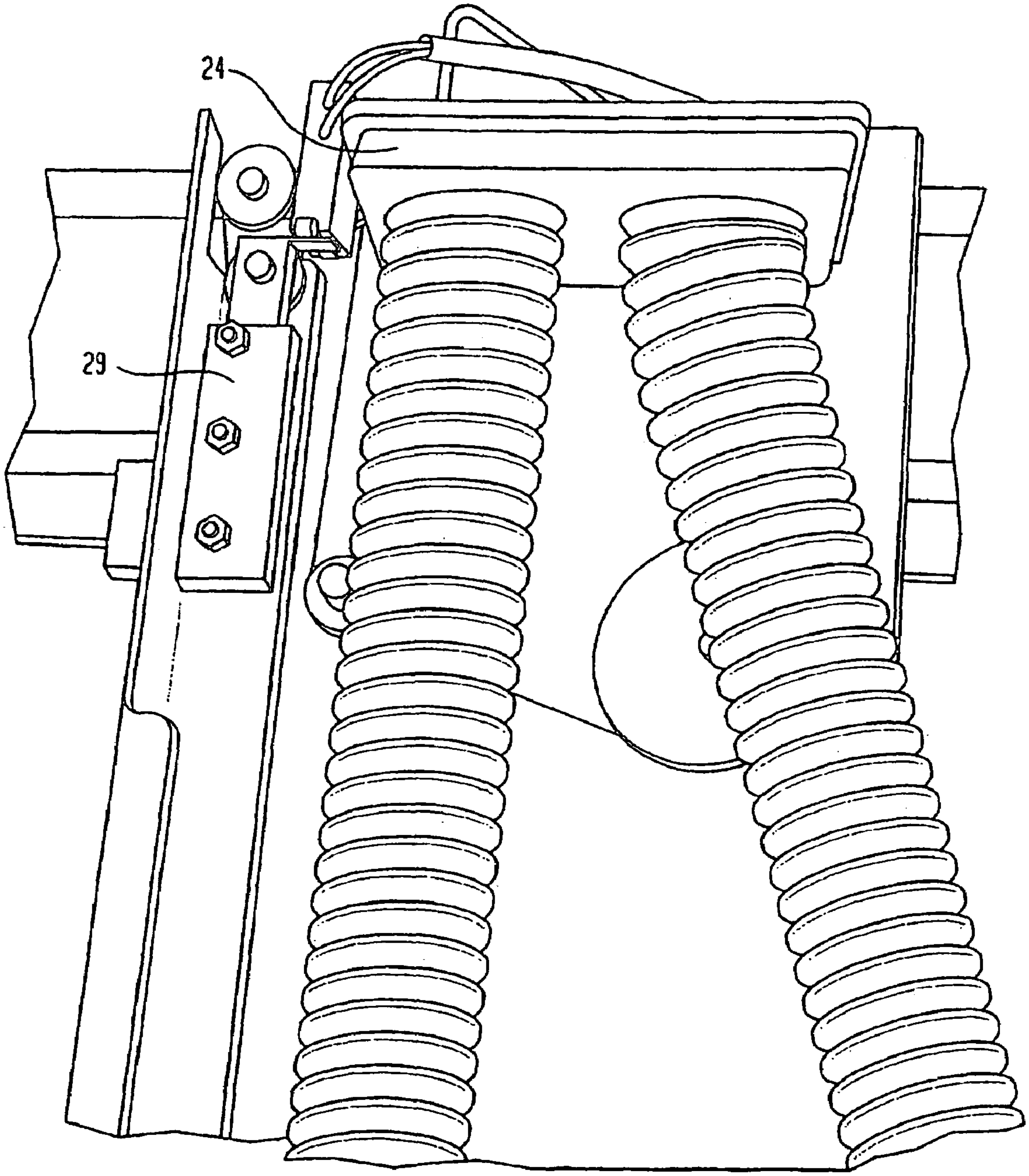
Figure 13:
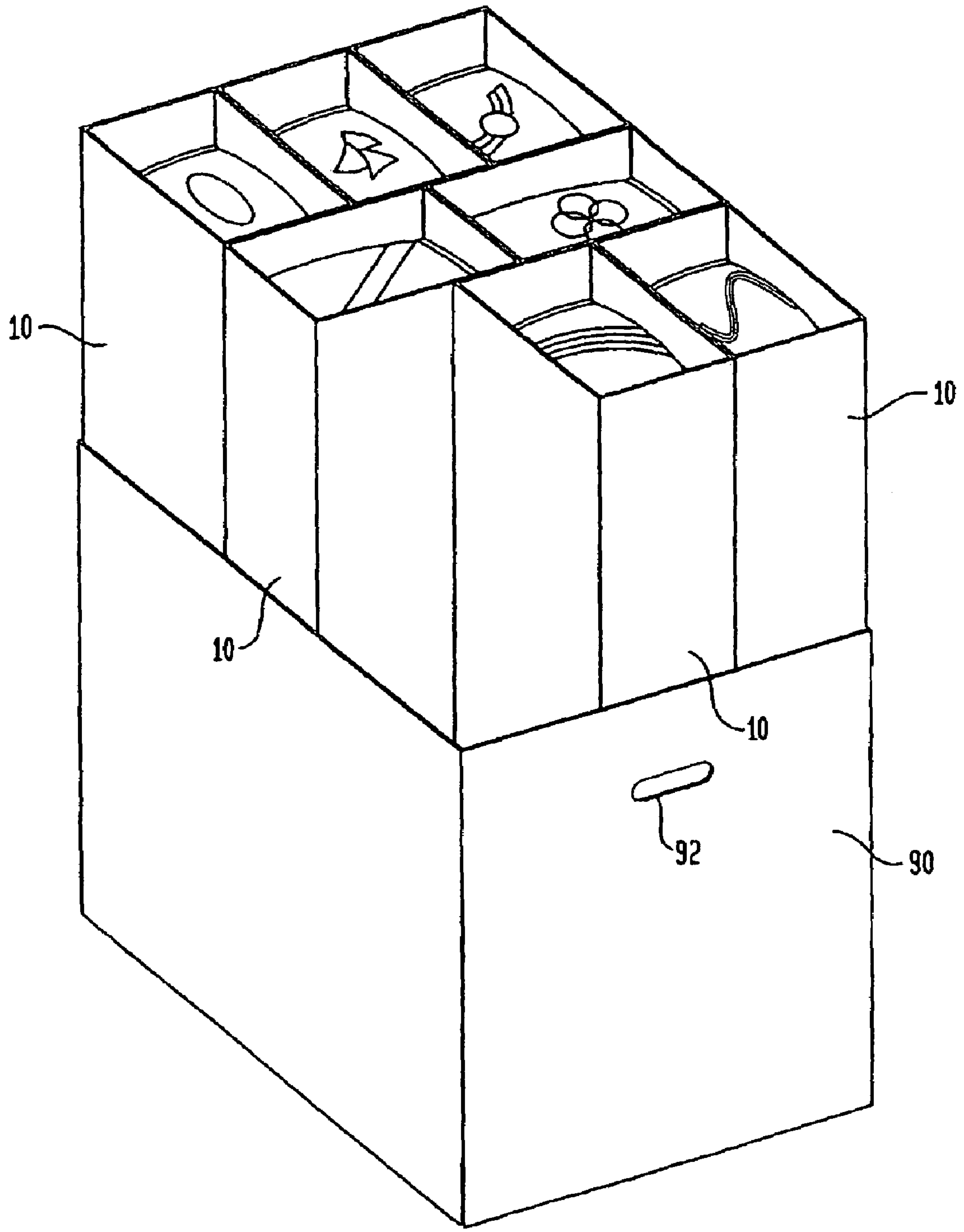
FIGS. 13-16 illustrate details of the macro-box product containment portion of the vending machine shown in FIG. 1.
Figure 14:
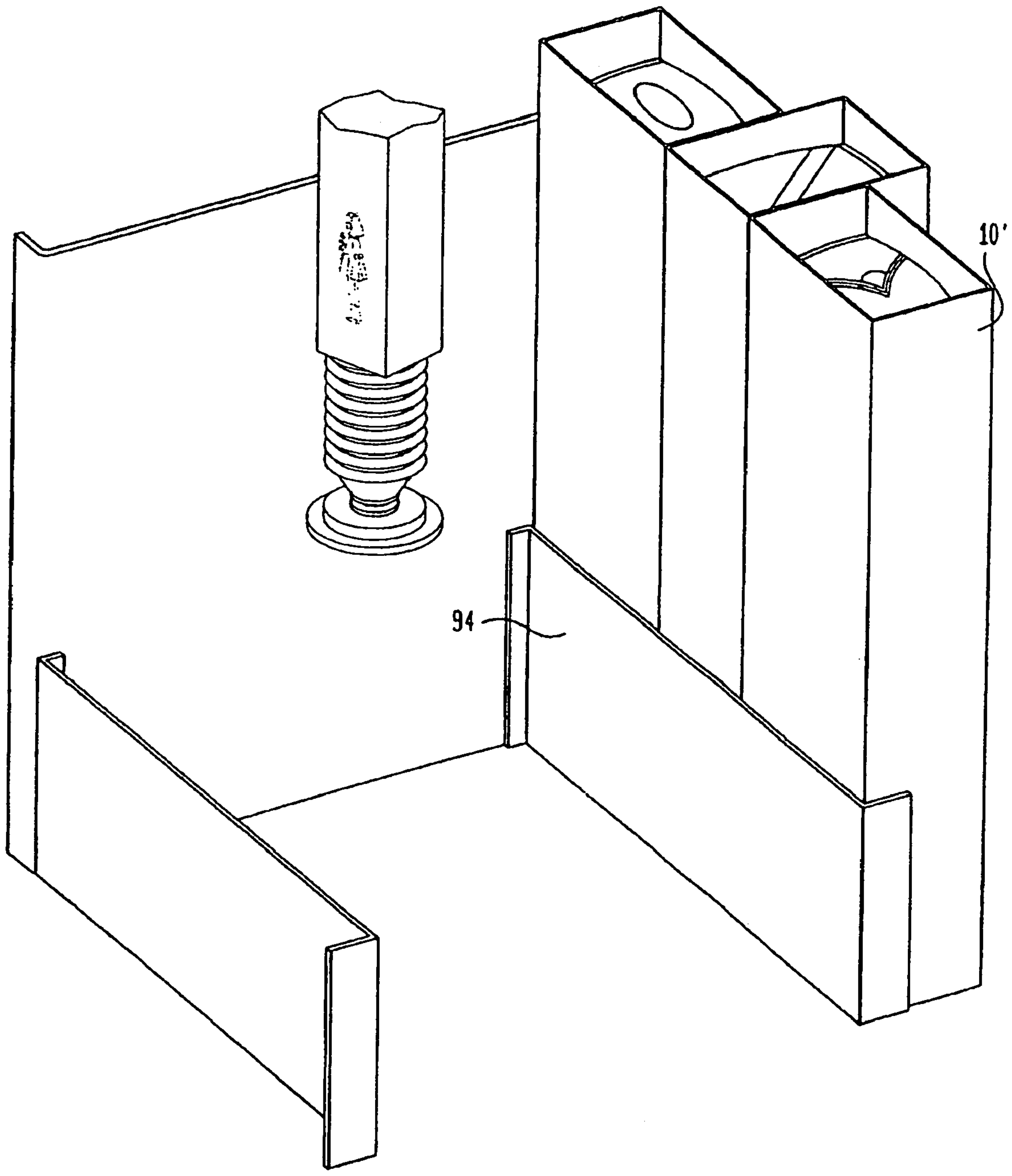
Figure 15:
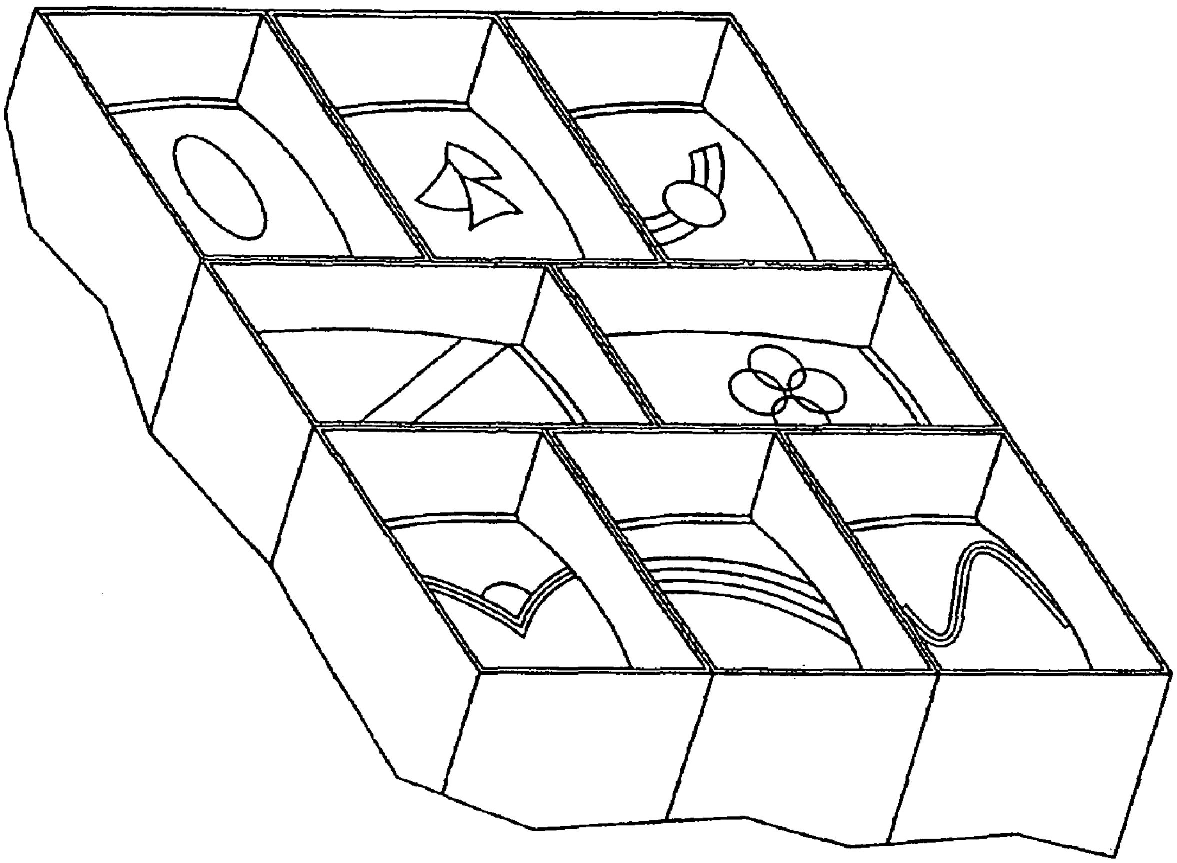
Figure 16:
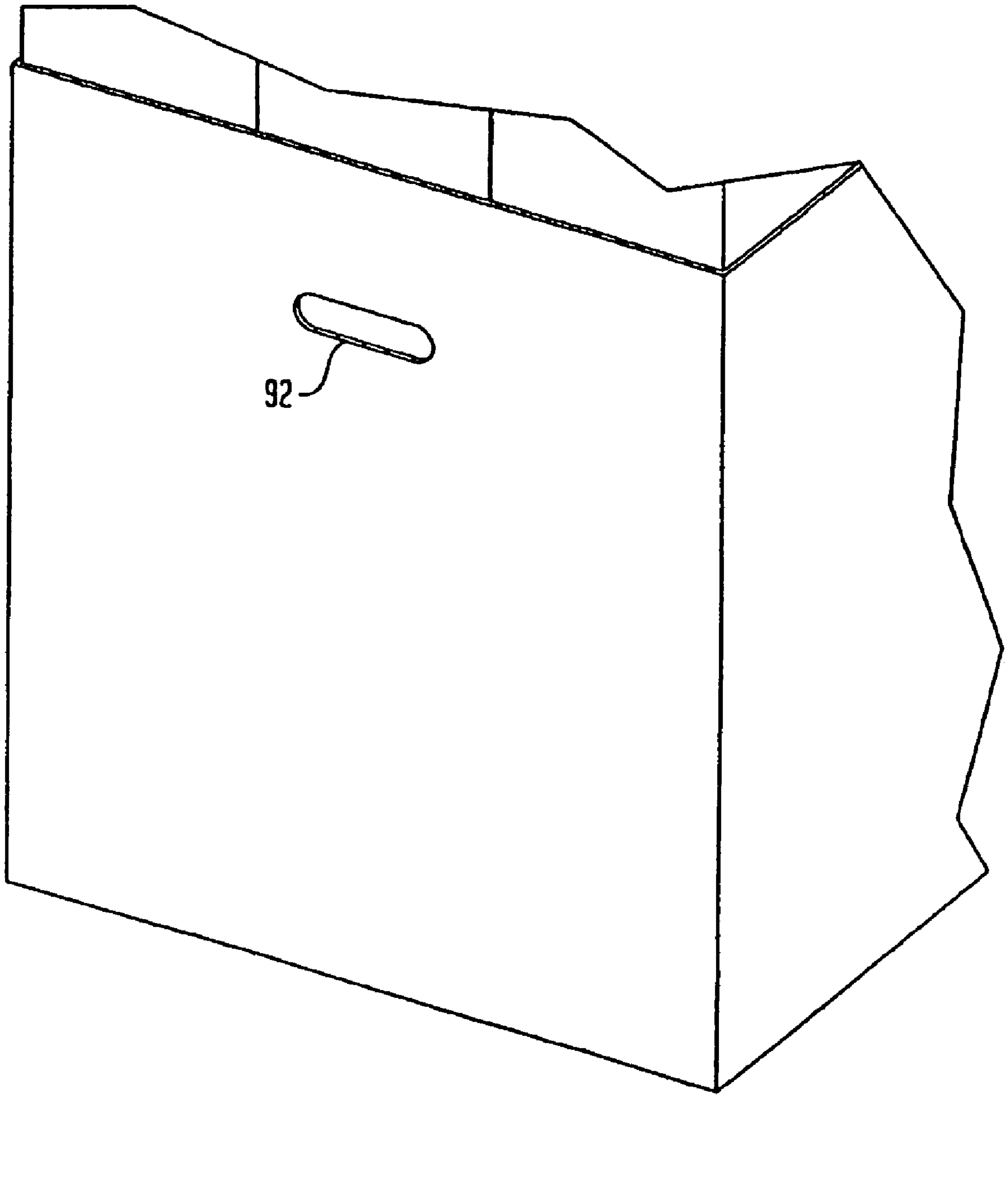

In accordance with an even further preferred embodiment of this aspect of the invention, a sensor responsive to a change in vacuum pressure in air hose 26 (or hose 23 or 21) is used to provide an indication signal that suction cup 32 has made a good contact with the product. The indication signal is then useful to initiate the controlled removal of the product from bin 10. In the event of a failure of the vacuum change sensor, a cable "slack" sensor arrangement (including a deadweight 29 shown in FIGS. 4 and 12) which monitors the tension in cable 30, can be used as a backup detector to indicate when product lifter head 28 has contacted the product.

In accordance with another aspect of the present invention, as shown in FIG. 8, the blower motor 20 is housed so as to minimize its encroachment into the product storage area 11, and thereby help maximize the footprint of the product storage area.

Additionally, an airway 203 is provided to offset the location of the connection point between blower motor 20 and hose 21, in order to further maximize the footprint of the product storage area. Additionally, in accordance with a further aspect of the present invention, the top portion 19 of the blower motor housing (shown in FIG. 6) also serves as a bottom support for a product storage bin. In an alternate embodiment the entire blower motor can be mounted to an with front door 4, so as to even further maximize the footprint of the product storage area 11. In a still further alternate embodiment, blower motor can be mounted to the front of the cabinet, where not only will it substantially protrude into the space of the door, but, if desired can be integrated into the gusset structure.

Referring now to FIGS. 4-7, various aspects of the invention relating to novel product storage bin arrangements are shown.

Figure 17:
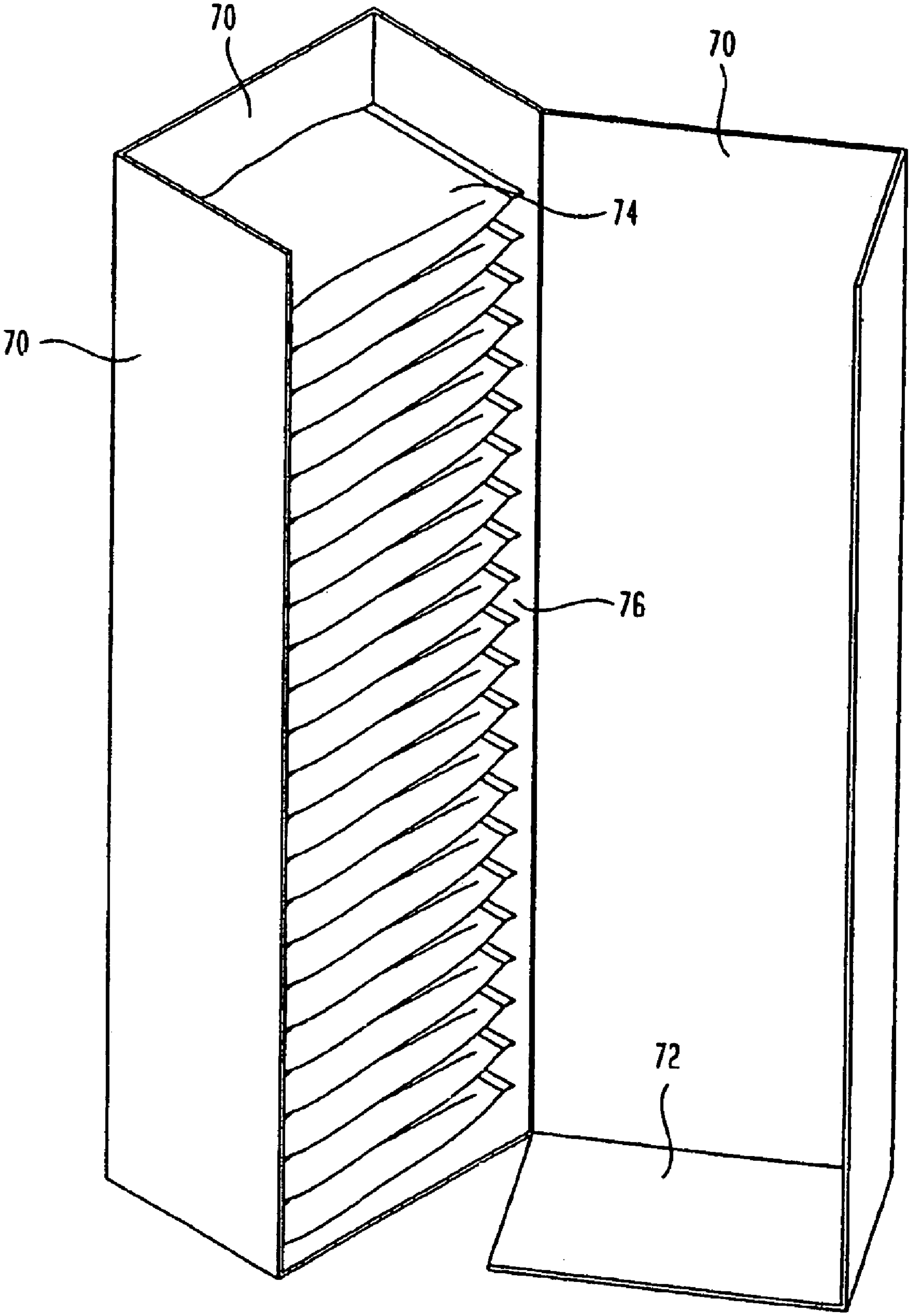
FIG. 17 illustrates details of the individual bin construction, including a hinge portion.
Figure 18:
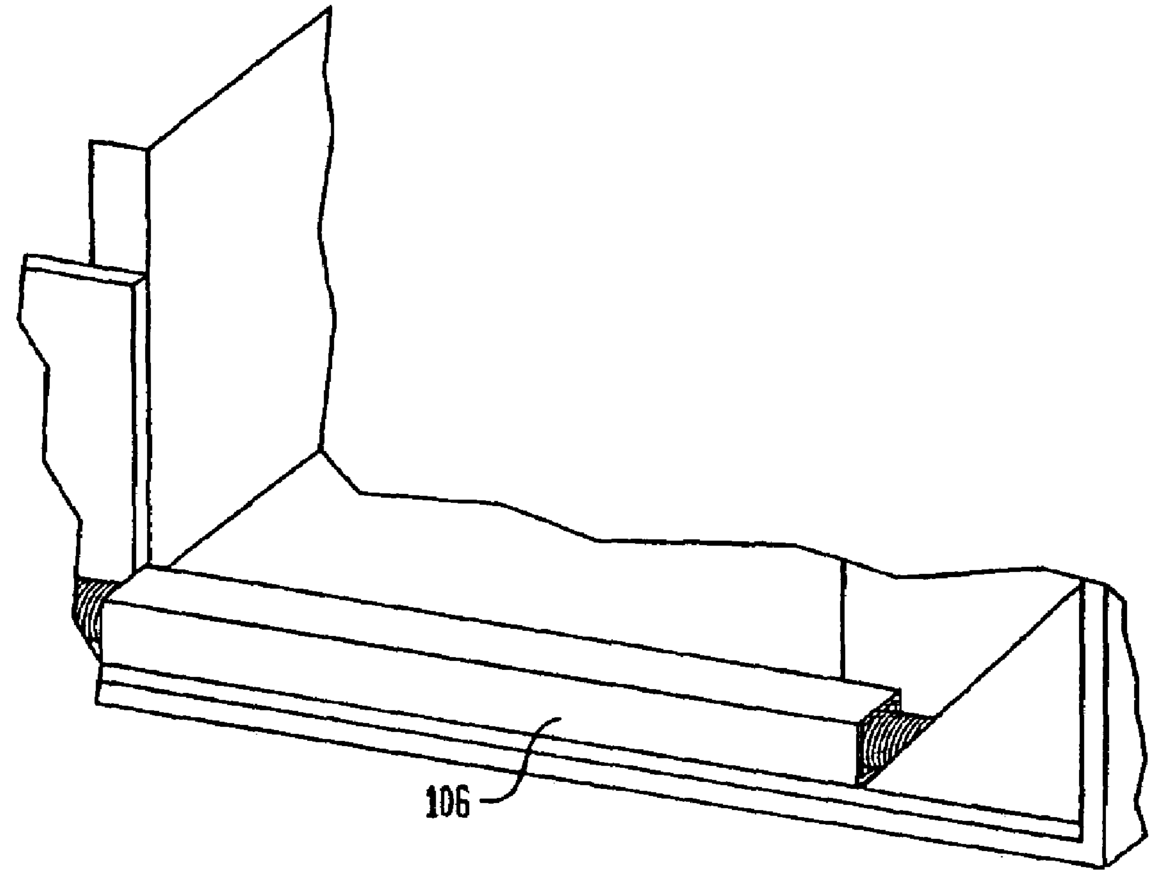
FIG. 18 illustrates a front view of the lower portion of vending machine shown in FIG. 1.

FIGS. 7, 13, 16 and 17 illustrate details of the product storage bin system. As shown in FIG. 17, each individual product storage bin 10 is comprised of a pre-formed cardboard cutout which is foldable so as to form generally rectangular walls 70 and a floor 72, as well as a "live-hinge" or crease 76. Hinge 76 allows bin 10 to be easily loaded by sliding product from bottom of bin towards the top of bin and placing new product in the lower portion of bin, thereby achieving first in first out product dispensing. A top end of each bin 10 is open, and into which packaged products 74 are stacked. Although bins such as bins 10 are known from the inventors forenoted prior US patent, which provides advantages such as easy pre-loading at a central location in an assembly line fashion, relatively quick restocking as compared to handling each piece of product in an individual manner, further improvements are desirable.

It would be desirable to have improved flexibility in the choice of the number of different types of vendible products that can be stored in the respective columns or bins and to more easily and efficiently match product demand with storage capacity. Furthermore, in prior art machines loading product at the machine location is generally inefficient due to the multiplicity of the closely stacked bins, as well as obstructions caused by the position of other components and structures in the machine, such as those which are used to reinforce the rigidity of the cabinet.

Thus, in accordance further aspects of the present inventions, and as shown in FIG. 2 a "macro-box" 90 method and apparatus is provided for storage bin containment. As described below, the macro-box system coordinates improvements in product bin storage in combination with the structure of the vending machine cabinet, so as to increase product storage capacity, as well as to improve the ease and efficiency of product handling, access and loading into the machine, while maintaining the rigidity and structure of the cabinet.

As shown more specifically in FIGS. 7 and 13-16, macro-box 90 is dimensioned to contain a plurality of individual product storage bins 10 therein, in a prearranged fixed arrangement. In the illustrated embodiment, eight similarly sized such product bins 10 are housed therein, however, use of differently sized bins and a different orientations of the bins inside box 90 can also be used, as long as they remain vertically aligned. A handle cut-out 92 is formed in at least one side of box 90 to greatly assist the machine/operator with the handling of groups of bins 10. In the illustrated embodiment the left-right width of macro-box 90 is dimensioned to house the width of 3 bins 10. Accordingly an extra width of bins 10, labeled 10', are able to be positioned to either side of macro-box 90. This arrangement is particularly advantageous in that it allows relatively unobtrusive metal dividers 94 (shown in FIGS. 7, 8 and 14) to be fixed to the bottom of storage area 11 which position and retain bins 101 in place during loading. Not only do dividers 94 keep bins 10' from falling during loading, but they also keep storage area, 11 clear so that the relatively heavy macro-box 90 can be easily inserted and removed therebetween during the loading process. In one alternate embodiment all of the bins in machine 2 could be contained in one macro-box, thereby allowing the entire inventory of the machine to be removed in one step. In a further alternate embodiment when some or all of the bins are contained in a macro-box, the lower front horizontal edge of the box could be hinged to the cabinet so as to allow the entire box to be tilted forward into a stable position at an angle which facilitates loading and replacement of individual bins.

It is noted that in a vending machine of this type for dispensing frozen products, such as the one noted above, since the products were located in a freezer, structural components for adding rigidity to the cabinet (needed, for example, when the front door is open) typically did not adversely affect the product storage area or product capacity of the machine. However, in the present arrangement, use of horizontally or vertically extending support beams, panels, etc. to add structural rigidity could easily encroach upon or block access to storage area 11, thereby reducing product storage capacity and/or impeding the easy loading of the product bins into the machine.

Accordingly, in accordance with further aspects of the present inventions, rigidity components affixed to the cabinet are placed so as to join adjacent and/or opposed walls thereof while making minimum encroachment into the volume of storage area 11 and at the same time leaving more than one-third of the front width access to area 11 unobstructed, more than 50% unobstructed in the vertical dimension, and about 95% unobstructed in the depth dimension. As noted above, in the illustrated embodiment about ⅗ of the front width is unobstructed, so that a particularly good arrangement is to have one macro-box 90 of ⅗th's width substantially centered in storage area 11, with an additional ⅕ width located to its right and left for the extra row on bins 10'.

Figure 9:
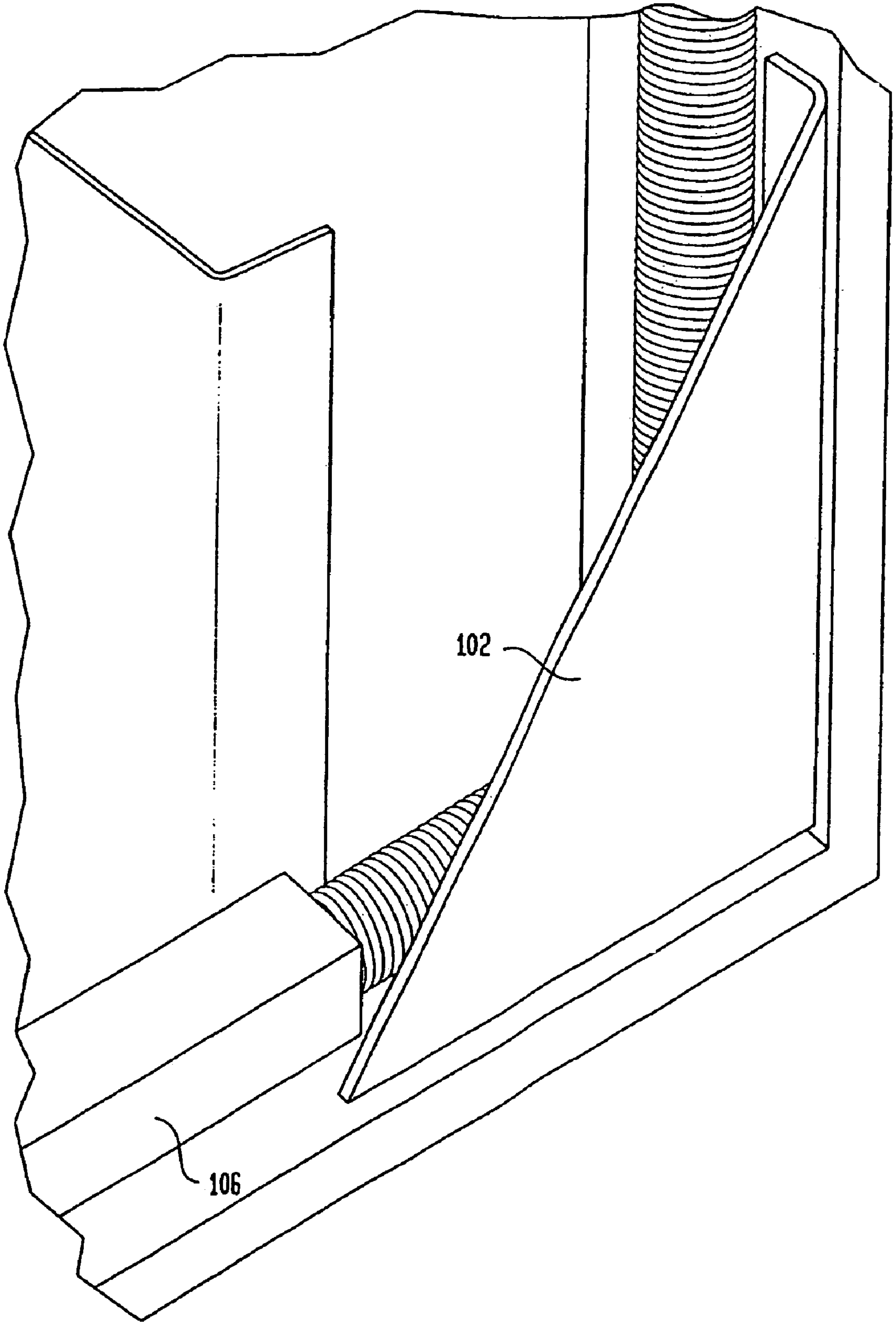
FIGS. 9 and 10 illustrate details of further gusset portions of the vending machine shown in FIG. 1.
Figure 10:
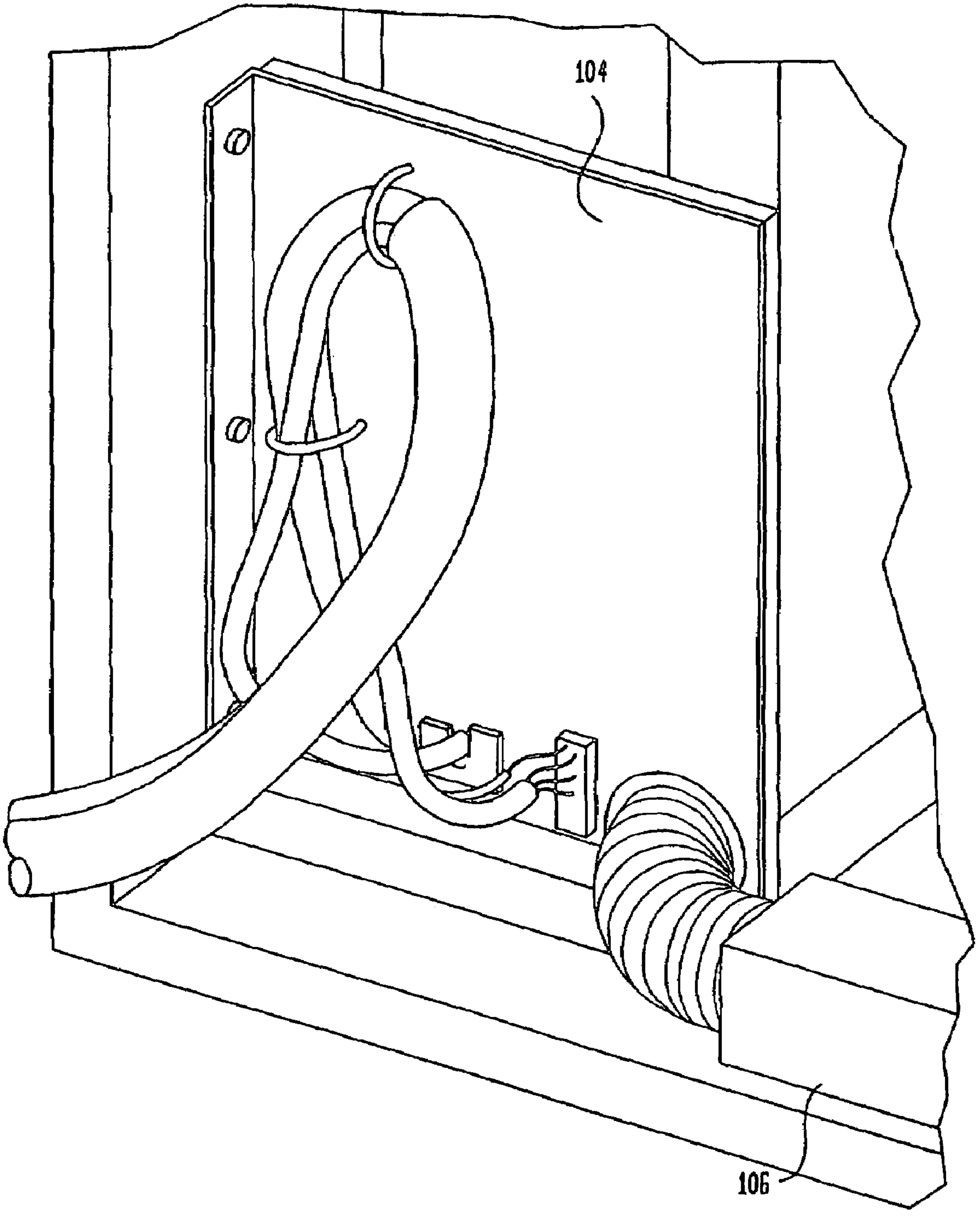

More specifically, as shown in general in FIG. 2, and in more detail in FIGS. 9 and 10, corner gussets 102 and 104 are bolted near the front of machine 2 to adjacent walls thereof to hold the cabinet square and stable when the front door is open. Due to their small and generally triangular shape and their location at the front of cabinet 2, they encroach very little into storage area 11 and present a minimum of obstruction during product loading. Gusset 102, in addition to providing rigidity for cabinet 3, also provides an attachment point for securing hose 21 as it is directed up to vacuum junction 22. Gusset 104, in addition to providing rigidity for cabinet 3, also provides a bulk head for many of the electrical connections, acts as a guide for air hose 21, defines a firm boundary for a corner of storage area 11, as well as providing structural support for bins 10'. These Figures also illustrate a guide 106, which, although not providing for structural support, guides and protects air hose 21 on its path to vacuum junction 22 as well as defining the front end of storage area 11 and providing a firm boundary for retaining the position of macro-box 90. One alternate embodiment would allow for one or more macro-boxes to be inserted into a cabinet 2, while placing a structural support panel disposed across the front upper portion of the cabinet. Yet a further embodiment would allow for two panels (one left and one right of the front center), positioned in the front plane of the cabinet from its base to its roof, leaving an opening therebetween which is at least 33% of the width of the cabinet (in order to allow removal of bins and macro-boxes therebetween). One of these vertical panels could be utilized as a frame on which to mount the control systems, coin systems, money and credit systems, as well as the coin box, which are located on the door in the current embodiment.

Although not specifically illustrated, top left and top right gussets, of similar shape to gusset 102 also act as safety stops for the x-y positioner, preventing it from traveling past the inside bounds of the cabinet if it runs past front/back "home" position switches.

In accordance with further aspects of the inventions, the product display panels provided in conjunction with the vending machine enhance the sales of primary products as compared with secondary products also vendible therefrom. This is accomplished by providing first and second types of display panels inside the vending machine which are visible from a customer viewing side, i.e., from outside the front of the machine. The first type of panel displays on a continuous or singular graphic medium (single graphic sheet or card) a plurality of graphics for the products and selections vendible from the vending machine. This singular multi-graphic medium can include product selection numbers and/or prices. The second type of display panels comprise only individual product graphic mediums for respective individual selections of the products which are vendible from the vending machine. These second types of display cards typically won't have product selection numbers and/or prices permanently printed thereon. This allows product producers to maintain a level of control over the appearance, selections, and pricing of a portion of the products being displayed in the machine. Additionally, the singular graphic medium could be enhanced with electronic tamper monitoring devices (such as optical, mechanical, electrical, magnetic and other types of sensor devices) integrated with or connected to the medium or its mounting system (such as a frame, etc.), so as to alert the product manufacturer through a communication means (e.g., a wireless device or phone modem or data code) of the tampering. Furthermore the tampering monitoring system could be connected with the control system of the machine so as to partially or fully disable the machine from operation. In the event of such disablement the operator could be required to receive an encrypted code from the product manufacturer in order to reactivate the machine. Additionally the control system could be designed to limit the total number of selections, so as to restrict the machine operator's ability to attempt to dilute the primary product by simply increasing the number of secondary product selections.

In one aspect of the invention the singular multi-graphic medium is relatively-difficult to remove from the vending machine, while the individual display cards are relatively easier to remove. In a preferred embodiment of this aspect of the invention, the singular multi-graphic medium typically displays more than 50% of the vendible products thereon. In another aspect of the invention, product display panels of the first type also include a product identifier code in the graphic associated with each of the vendible products shown thereon, which codes are needed by the customer to purchase the product. The individual display cards may or may not have selection numbers or pricing printed directly on the graphic cards.

Figure 25:
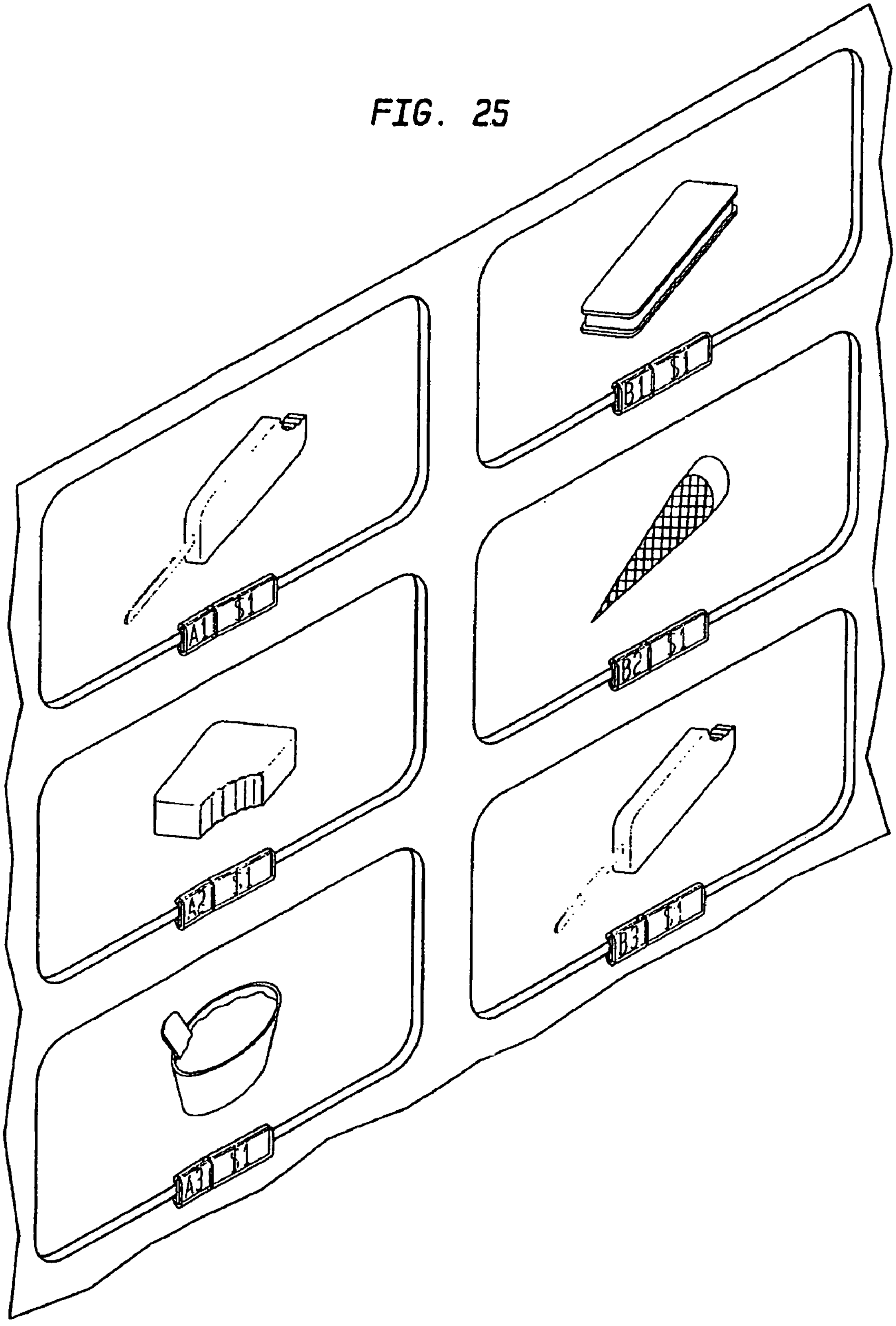
FIGS. 25 to 27 illustrate the easily removable individual display graphic cards, and their mounting to the inside of the card holder frame.
Figure 26:
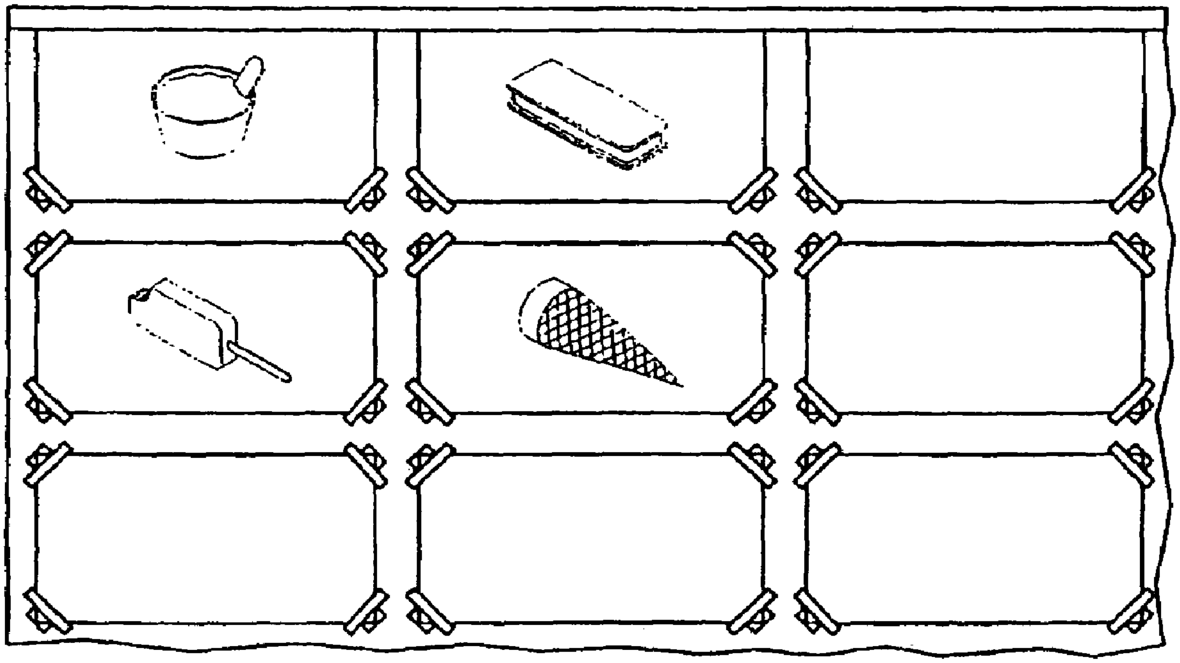
Figure 27:
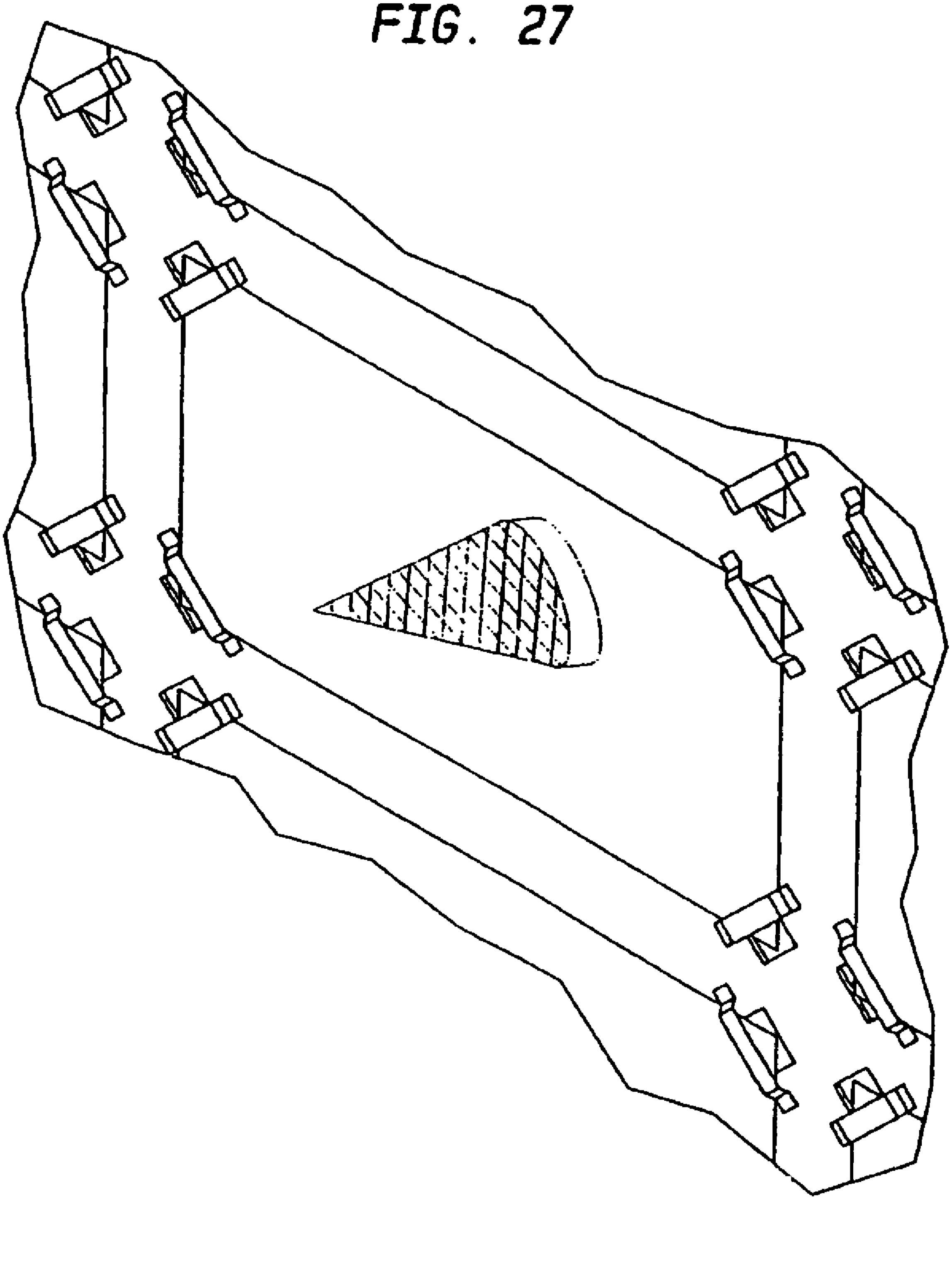

In this regard, it is noted that FIGS. 21 to 24 illustrate the primary type of graphic card, comprising a single sheet 210 having multi-graphic product displays 212 thereon. FIGS. 25 to 27 illustrate the easily removable individual display graphic cards, and their mounting to the inside of the card holder frame; and FIG. 28 illustrates a graphic and product stabilizer on the robot head.

Figure 11:
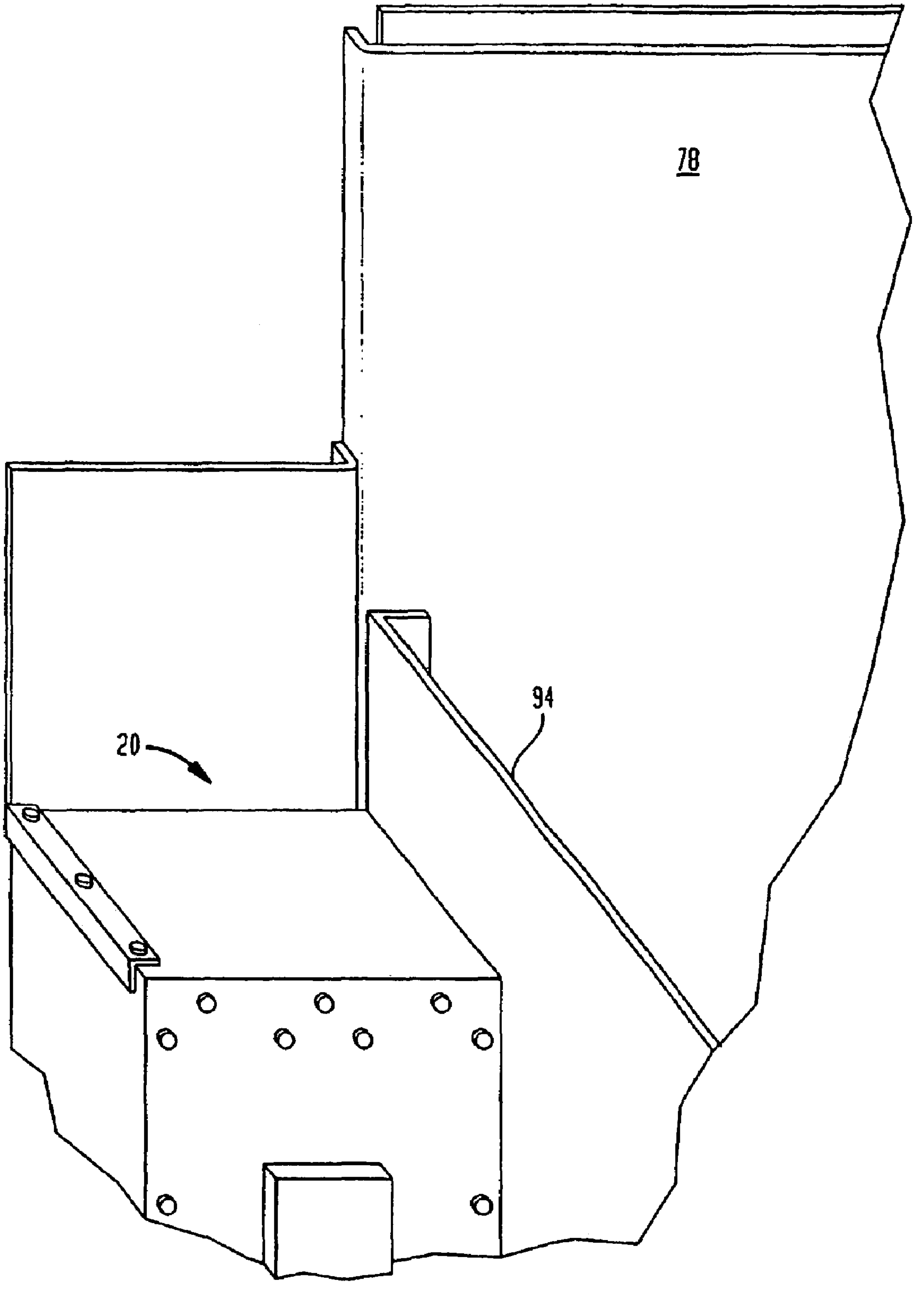
FIG. 11 illustrates details of the counterweight portion of the vending machine shown in FIG. 1.

It is noted that in a vending machine of this type for dispensing frozen products, such as described in the present inventors forenoted US patent, a freezer is mounted in storage area 11. The weight of the freezer acted as a counterweight for the machine when the door was opened. If there is no freezer, safety dictates that provision must be made to supply one. However, it is desirable that it be accomplished in a manner which least affects the amount of product storage area, and minimizes difficulties relating to product access and loading. In accordance with the present invention, as shown in FIG. 11, a sheet metal frame 78 is fixed to the rear wail of cabinet 3, for enclosing a suitable weight, i.e., cement blocks. The blocks may be enclosed in a suitable cardboard box, to dampen any shock load to the blocks during shipment and to prevent migration of cement dust. The sheet metal holds the blocks in place, acts as a backstop for the macro containment boxes, as well as stiffening the rear wall. If sufficient weight is added to the cabinet by adding thereto machine components, then the blocks are not necessary.

Thus, there has been shown and described many improvements for a vending machine which fulfill all the objects and advantages sought therefore. Many changes, modifications, variations, and other uses and applications of the subject invention will, however, become apparent to those skilled in the art after considering this specification and its accompanying drawings which disclose preferred embodiments thereof. For example, although lifting mechanism is positionable in 3 axes, in some applications only 2 axes of movement may be needed, such as in a single row vending machine.

Furthermore, instead of using gussets/supports of triangular or rectangular design, gussets/supports of other designs are just as usable, as long as their shape is not inconsistent with what is described herein, such as vertically extending bars or panels which are widely spaced apart at the front of the machine. All such changes, modifications, variations and other uses and applications which do not depart from the spirit and scope of the invention are deemed to be covered by this patent.

The invention claimed is:

1. An article dispensing apparatus, comprising:

a housing for forming exterior sides and enclosing an interior volume for the article dispensing apparatus, said interior volume including:

a storage area for storing a plurality of different type articles to be dispensed, and user interface and control apparatus for allowing a user of the dispensing apparatus to initiate an article dispensing operation, and to cause one of a user selected article to be moved to a dispensing area of the dispensing apparatus, wherein, said exterior sides of said housing include at least one side, said one side having an article display area thereon for displaying articles that are selectable by the user, said article display area including a graphic substrate having at least one article graphic thereon which identifies a selectable article, which graphic is permanently fixed at a predetermined location thereon, a tamper sensor is coupled to said substrate for detecting a tampering of said article display area, which tampering would be attempt to change the display of articles that are selectable by the user, and a control portion of the user interface and control apparatus is coupled to said tamper sensor for monitoring detection of tampering, and in response to a detection of tampering, said control portion at least partially disabling further user initiated dispensing operation of said dispensing apparatus.

2. The article dispensing apparatus of claim 1, wherein said tamper sensor is coupled to the control portion of said user interface and control apparatus so as to limit dispensing by said dispensing apparatus from a number of different types of article selections to those selections shown only by the graphics of said substrate.

3. The article of dispensing apparatus of claim 1, wherein after said tamper sensor detects tampering, said user interface control apparatus communicates an alert, via a communication means, to a monitoring system external to said article dispensing apparatus.

4. The article dispensing apparatus of claim 1, wherein said partial disabling comprises disabling dispensing of a given one or more article selections.

5. The article dispensing apparatus of claim 3, wherein after said user interface and control apparatus communicates said alert, said user interface and control apparatus waits for an authorization code which can be applied to re-enable said disabled article dispensing apparatus.

6. An article dispensing apparatus, comprising:

a housing for forming exterior sides and enclosing an interior volume for the article dispensing apparatus, said interior volume including:

a storage area for storing a plurality of different type articles to be dispensed, and user interface and control apparatus for allowing a user of the dispensing apparatus to initiate an article dispensing operation by entering one of a plurality of article selection codes, and to cause one of a selected type of article to be moved to a dispensing area of the dispensing apparatus, and said exterior sides of said housing including at least one side, said one side having an article display area including;

a graphic substrate having at least one article graphic thereon which identifies a selectable article, which graphic is permanently fixed at a predetermined location thereon, a tamper sensor coupled to said substrate for detecting tampering of said substrate, and a control system coupled to said tamper sensor for monitoring tamper detection.

7. The article dispensing apparatus of claim 6, wherein said control system is operable so as to limit dispensing by said dispensing apparatus from a number of different types of article selections to only those selections shown by the graphics of said graphic substrate.

8. The article dispensing apparatus of claim 6, wherein said control system is responsive to said tamper detection for at least partially disabling said dispensing apparatus.

9. The article dispensing apparatus of claim 6, wherein said control system comprises a portion of the control portion of the article dispensing apparatus, and upon said sensor detecting tampering, said control portion communicates an alert, via a communication means, to a monitoring system external to said article dispensing apparatus.

10. The article dispensing apparatus of claim 8, wherein said partial disabling comprises disabling dispensing of a given one or more article selections.

11. The article dispensing apparatus of claim 8, wherein after said control system communicates said alert, said control system waits for an authorization code which can be applied to re-enable said at least partially disabled article dispensing apparatus.

12. An article dispensing apparatus, comprising:

a housing for forming exterior sides and enclosing an interior volume for the article dispensing apparatus, said interior volume including:

a storage area for storing a plurality of different type articles to be dispensed, and user interface and control apparatus for allowing a user of the dispensing apparatus to initiate an article dispensing operation by entering one of a plurality of article selection codes, and to cause one of a selected type of article to be moved to a dispensing area of the dispensing apparatus, wherein, said exterior sides of said housing include at least one side, said one side having an article display area comprising:

a first substrate having a plurality of article graphics which identify a plurality of selectable articles, which graphics are permanently fixed at predetermined locations thereon, and at least one of a second substrate having an article graphic which identifies a single selectable article, and wherein said article display area also includes a transparent window which allows a user to see into said interior volume of said dispensing apparatus, and wherein said first substrate and said at least a second substrate are positioned in the display area so as to form a periphery about said transparent window.

13. The article dispensing apparatus of claim 12, further including an article extracting device for selectively extracting articles from the storage volume.

14. The article dispensing apparatus of claim 13, wherein said article extracting device includes thereon a further graphic which is viewable using said transparent window during operation of said article extracting device.

15. The article dispensing apparatus of claim 12, wherein said one exterior side includes said user access device mounted thereon, which allows the user to provide article selection information to the control apparatus.

16. The article dispensing apparatus of claim 12, wherein a support frame is attached to an interior side of said housing which is opposite said one exterior side, said support frame including connecting structure for engaging at least outer edges of said first and second substrates.

17. The article dispensing apparatus of claim 12, further including a tamper control system coupled to said user interface and control apparatus and operable so as to limit dispensing by said dispensing apparatus from a number of different types of article selections to those selections shown by the graphics of said first substrate plus those selections shown by the graphics of a predetermined number of said second substrates.

18. The article dispensing apparatus of claim 12, wherein said first substrate includes as part of each product graphic at least one of a fixed article selection code or a fixed article price information.

19. The article dispensing apparatus of claim 12, further including an article extracting device for selectively extracting articles from the storage volume.

20. The article dispensing apparatus of claim 19, wherein said article extracting device includes thereon a further graphic which is viewable using said transparent window during operation of said article extracting device.

21. The article dispensing apparatus of claim 1, wherein the control portion of said user interface and control apparatus is responsive to said tamper detection for at least partially disabling said dispensing apparatus.

* * * * *